US012679136B2

(12) United States Patent
Tsubone et al.

(10) Patent No.: US 12,679,136 B2
(45) Date of Patent: Jul. 14, 2026

(54) DRIVING FORCE TRANSMISSION DEVICE AND ROTARY MECHANISM

(71) Applicants:Honda Motor Co., Ltd., Tokyo (JP);
STARLITE Co., Ltd., Osaka (JP);
NIDEC DRIVE TECHNOLOGY CORPORATION, Nagaokakyo (JP)

(72) Inventors: Taihei Tsubone, Nagaokakyo (JP);
Norio Deguchi, Nagaokakyo (JP);
Wataru Yada, Tokyo (JP); Ritsuya Oshima, Tokyo (JP); Tsutomu Yoshino, Tokyo (JP); Tadanori Hatta, Osaka (JP)

(73) Assignees: HONDA MOTOR CO., LTD., Tokyo (JP); STARLITE Co., Ltd., Osaka (JP); NIDEC DRIVE TECHNOLOGY CORPORATION, Kyoto (JP)

( * ) Notice: Subject to any disclaimer, the term of this patent is extended or adjusted under 35 U.S.C. 154(b) by 385 days.

(21) Appl. No.: 18/241,572

(22) Filed: Sep. 1, 2023

(65) Prior Publication Data

US 2024/0077134 A1     Mar. 7, 2024

(30) Foreign Application Priority Data

Sep. 5, 2022    (JP) ................................. 2022-140963

(51) Int. Cl.
*B60B 19/00* (2006.01)
*B60B 19/12* (2006.01)
(Continued)

(52) U.S. Cl.
CPC ............ *B60B 19/003* (2013.01); *B60B 19/12* (2013.01); *B60B 27/0021* (2013.01);
(Continued)

(58) Field of Classification Search
CPC ..... B60B 19/003; B60B 19/12; B60B 19/125; B60B 27/0021; B60B 37/04; B62K 1/00;
(Continued)

(56) References Cited

U.S. PATENT DOCUMENTS 8,342,270 B2 * 1/2013 Takenaka .............. B60B 19/003
180/21
9,415,630 B2 * 8/2016 Yoshino ............... B62K 11/007
(Continued)

FOREIGN PATENT DOCUMENTS

JP          2011062785 A  *  3/2011
JP          2025068310 A  *  4/2025
WO     WO-2021039918 A1 *  3/2021  ............. B60B 19/00

*Primary Examiner* — Adam D Rogers

(74) *Attorney, Agent, or Firm* — Keating & Bennett, LLP

(57) ABSTRACT

A driving force transmission device includes drive rollers, roller support portions, and a roller arrangement portion. The drive rollers transmit a driving force to a main wheel. The roller support portions rotatably support the drive rollers. The roller arrangement portion includes a base, an outer frame, and an inner frame. The base expands radially outward with respect to a rotation axis. The outer frame extends in a circumferential direction around the rotation axis and protrudes from the base in an axial direction along the rotation axis. The inner frame is radially inside the outer frame and protrudes from the base in the axial direction. The roller support portions are fitted between the inner circumferential surface of the outer frame and the outer circumferential surface of the inner frame.

11 Claims, 16 Drawing Sheets

(51) Int. Cl.
| | |
|---|---|
| *B60B 27/00* | (2006.01) |
| *B60B 37/04* | (2006.01) |
| *B62K 1/00* | (2006.01) |
| *B62M 13/00* | (2010.01) |
| *F16H 37/02* | (2006.01) |

(52) U.S. Cl.
CPC ............. *B60B 37/04* (2013.01); *B62M 13/00* (2013.01); *F16H 37/02* (2013.01); *B62K 1/00* (2013.01)

(58) Field of Classification Search
CPC ............... B60K 7/0007; B60K 17/043; B60K 2007/0061; F16H 13/08; F16H 37/02; F16H 37/065; B62M 13/00
See application file for complete search history.

(56) References Cited

U.S. PATENT DOCUMENTS

| | | | | |
|---|---|---|---|---|
| 9,809,277 | B2 * | 11/2017 | Yoshino | ................ B60B 19/003 |
| 10,179,627 | B2 * | 1/2019 | Yada | ........................ B62H 1/12 |
| 11,813,890 | B2 * | 11/2023 | Oshima | ................ B60B 19/003 |
| 11,945,545 | B2 * | 4/2024 | Yada | ........................ B62K 21/00 |
| 11,993,345 | B2 * | 5/2024 | Yada | ........................ B62M 6/75 |
| 12,049,103 | B2 * | 7/2024 | Tsubone | .............. B60K 7/0007 |
| 12,157,535 | B2 * | 12/2024 | Yada | ...................... B62M 13/04 |
| 12,247,643 | B2 * | 3/2025 | Tsubone | ................... F16H 1/24 |
| 12,558,918 | B2 * | 2/2026 | Tsubone | ................ B60B 19/003 |
| 2016/0304163 | A1 | 10/2016 | Yoshino et al. | |
| 2021/0300109 | A1 * | 9/2021 | Tsubone | .............. B60B 19/003 |
| 2021/0301904 | A1 * | 9/2021 | Tsubone | .............. B60B 19/003 |
| 2024/0109366 | A1 * | 4/2024 | Tsubone | .............. B60K 7/0007 |
| 2025/0346070 | A1 * | 11/2025 | Jung | ........................ B60B 19/12 |

* cited by examiner

DRIVING FORCE TRANSMISSION DEVICE AND ROTARY MECHANISM

CROSS-REFERENCE TO RELATED APPLICATIONS

The present application claims priority under 35 U.S.C. § 119 to Japanese Patent Application No. 2022-140963, filed on Sep. 5, 2022, the entire contents of which are hereby incorporated herein by reference.

1. FIELD OF THE INVENTION

The present invention relates to a driving force transmission device and a rotary assembly.

2. BACKGROUND

In a conventional friction traveling device, a drive disk is configured by a hub, a wheel, and a plurality of holders, a first end piece portion of each holder is attached to the hub, and a second end piece portion is attached to the wheel. The drive roller is disposed between two adjacent holders and supported at both ends thereof.

However, in the conventional friction traveling device, the hub and the holder are fastened by bolts, and the wheel and the holder are fastened by bolts. Therefore, the work of assembling the plurality of holders (the plurality of roller support portions) to the hub and the wheel is complicated.

SUMMARY

An example embodiment of a driving force transmission device of the present disclosure transmits a driving force to a main wheel including a plurality of driven rollers by rotating about the rotation axis. The driving force transmission device includes a plurality of drive rollers, a plurality of roller support portions, and a roller arrangement portion. The plurality of drive rollers are in an annular shape and transmit the driving force to the main wheel. The plurality of roller support portions are in an annular shape and rotatably support the plurality of drive rollers. The plurality of drive rollers and the plurality of roller support portions are located in the roller arrangement portion. The roller arrangement portion includes a base portion, an outer frame portion, and an inner frame portion. The base portion extends radially outward with respect to the rotation axis. The outer frame portion is located along a circumferential direction around the rotation axis, and protrudes from the base portion in an axial direction along the rotation axis. The inner frame portion is located radially inside the outer frame portion and protrudes from the base portion in the axial direction. The plurality of roller support portions are fitted between an inner circumferential surface of the outer frame portion and an outer circumferential surface of the inner frame portion.

An example embodiment of a rotary assembly of the present disclosure includes a main wheel and a pair of driving force transmission devices. The main wheel includes a plurality of driven rollers in an annular shape and rotating around a rotation axis. The pair of driving force transmission devices transmits a driving force to the main wheel. One driving force transmission device of the pair of driving force transmission devices is the driving force transmission device, and transmits the driving force to the main wheel from one side in the axial direction along the rotation axis. The other driving force transmission device of the pair of driving force transmission devices has a structure symmetrical to the one driving force transmission device with respect to the main wheel, and transmits the driving force to the main wheel from the other side in the axial direction along the rotation axis.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 3 is a bottom view illustrating the transport vehicle according to the present example embodiment.

FIG. 5 is a perspective view illustrating a main wheel and a pair of driving force transmission devices according to the present example embodiment.

DETAILED DESCRIPTION

Figure 1:
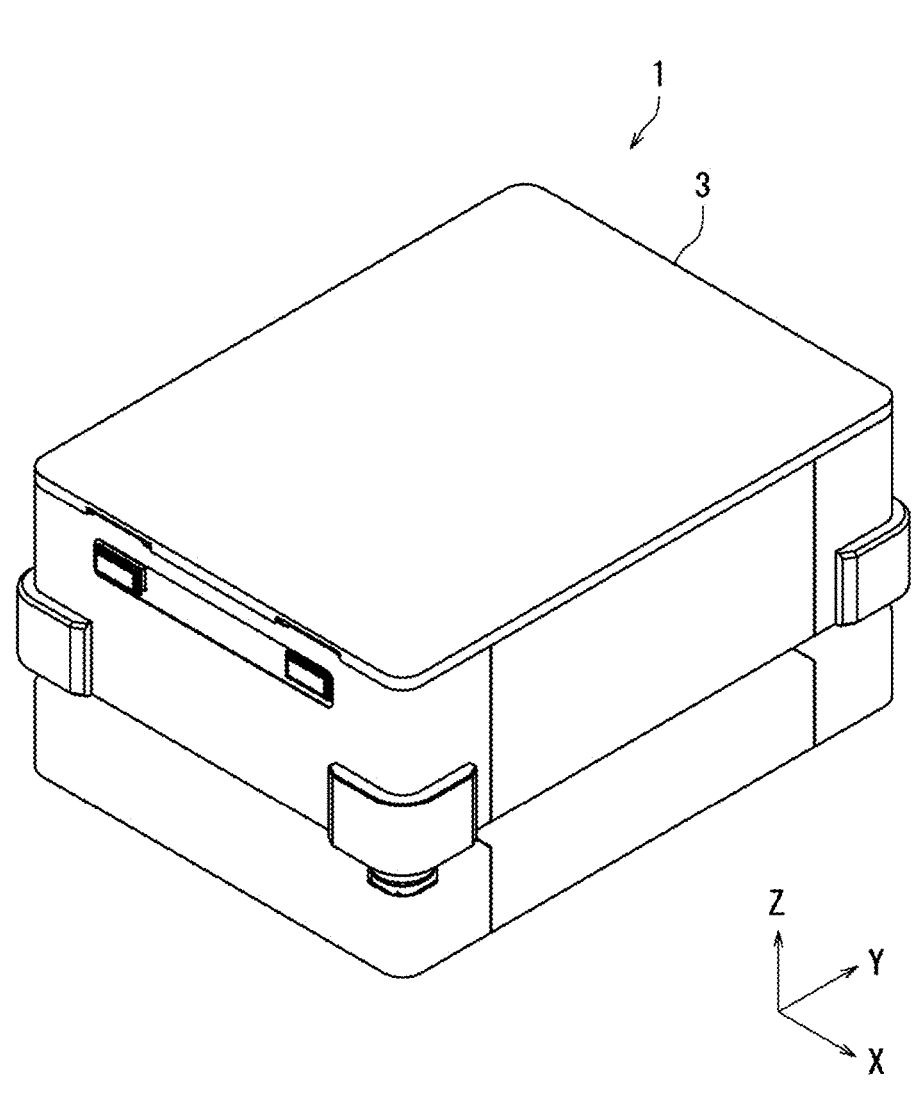
FIG. 1 is a perspective view illustrating a transport vehicle according to an example embodiment of the present disclosure.

Hereinafter, example embodiments of the present disclosure will be described with reference to the drawings. Note that in the drawings, the same or corresponding parts will be denoted by the same reference symbols and description of such parts will not be repeated. In the drawings, the X, Y, and Z axes of the three-dimensional orthogonal coordinate system are described as appropriate for ease of understanding. As an example, the X axis and the Y axis are substantially parallel to the horizontal direction, and the Z axis is substantially parallel to the vertical direction.

In this specification, a direction parallel to a rotation axis AX (e.g., FIG. 3) of a rotary assembly is described as an "axial direction AD". The direction orthogonal to the rotation axis AX is described as a "radial direction RD". The "radial direction RD" may be any direction as long as it is a direction orthogonal to the rotation axis AX, and is not particularly limited. The direction along an arc about the rotation axis AX is described as a "circumferential direction CD".

In the present description, a "parallel direction" includes a substantially parallel direction, and an "orthogonal direction" includes a substantially orthogonal direction. Further, "left and right" indicates left and right when the object is viewed from the radial direction RD. The term, "in plan view", indicates that an object is viewed from the axial direction AD. A "plan view" is a diagram when an object is viewed in plan view.

Furthermore, in the present specification, the terms "rectangular parallelepiped shape", "disk shape", "annular shape", "cylindrical shape", "columnar shape", "semi-columnar shape", and "flat plate shape" do not denote shapes in a strict sense, but include, for example, shapes that can realize functions of the rotary assembly or the driving force transmission device in the present disclosure.

With reference to FIGS. 1 to 14, a transport vehicle 1, a rotary assembly DV, and driving force transmission devices 11A and 11B according to an example embodiment of the present disclosure will be described. First, the transport vehicle 1 will be described with reference to FIGS. 1 to 3.

Figure 2:
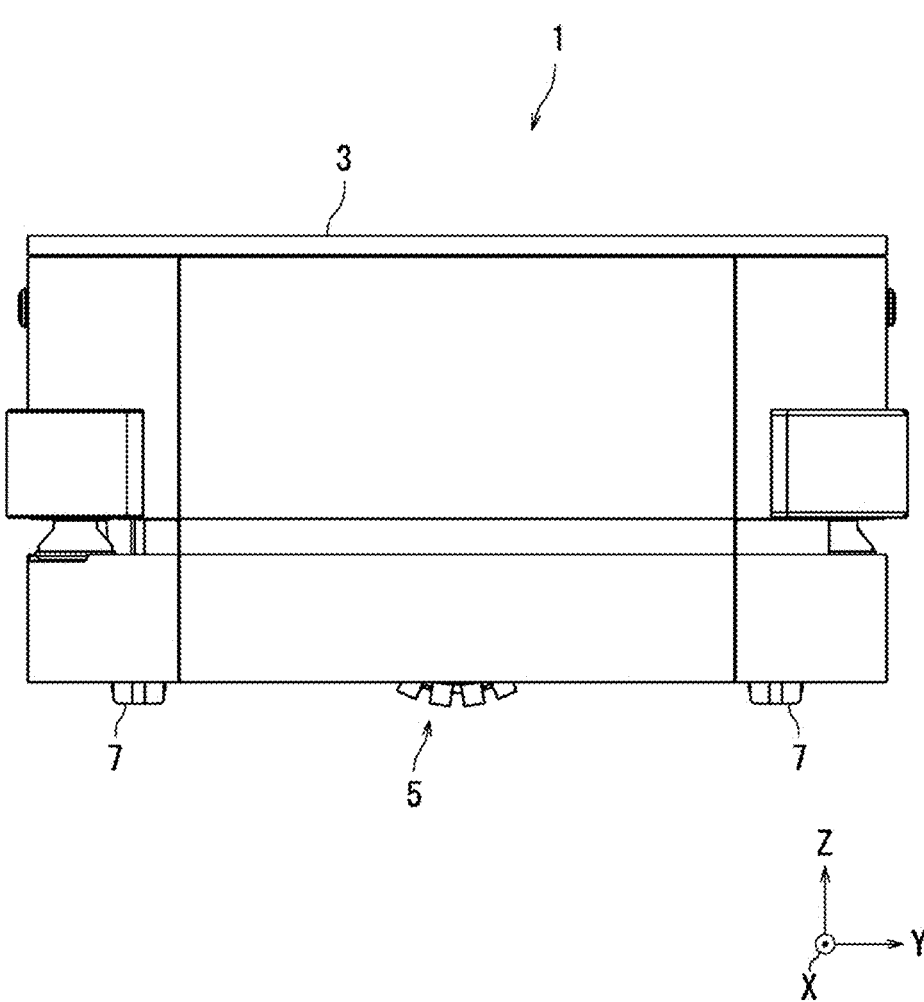
FIG. 2 is a side view illustrating the transport vehicle according to the present example embodiment.
Figure 3:
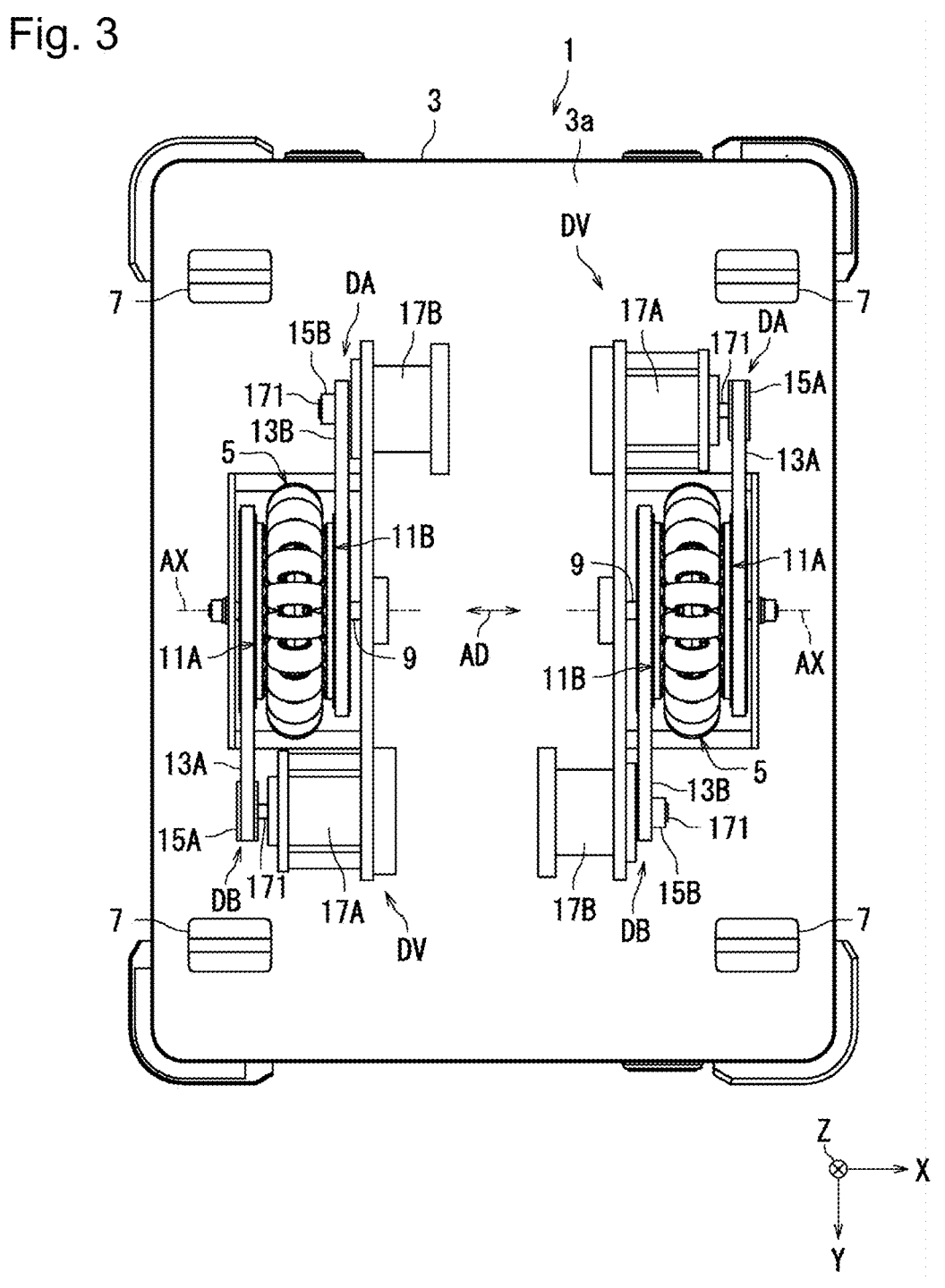

FIG. 1 is a perspective view illustrating the transport vehicle 1. FIG. 2 is a side view illustrating the transport vehicle 1. FIG. 3 is a bottom view illustrating the transport vehicle 1. In FIG. 3, the transport vehicle 1 is viewed from the floor surface or the ground surface side.

The transport vehicle 1 illustrated in FIGS. 1 and 2 travels on the floor surface or the ground surface. In the present example embodiment, the transport vehicle 1 is an automated guided vehicle (AGV). The transport vehicle 1 is an example of a moving body.

As illustrated in FIG. 1, the transport vehicle 1 has a vehicle body 3. In the examples of FIGS. 1 and 2, the vehicle body 3 has a substantially rectangular parallelepiped shape. However, the shape of the vehicle body 3 is not particularly limited.

As illustrated in FIGS. 2 and 3, the transport vehicle 1 further has a plurality of the rotary assembly DV and a plurality of wheels 7. In the present example embodiment, the transport vehicle 1 has a pair of rotary assemblies DV and four wheels 7. The four wheels 7 are respectively disposed at four corners of a bottom portion 3a of the vehicle body 3. Each wheel 7 rotates with the movement of the vehicle body 3. The pair of rotary assemblies DV rotate independently of each other to move the vehicle body 3. The pair of rotary assemblies DV are disposed at the bottom portion 3a of the vehicle body 3 so that the rotation axis AX of one rotary assembly DV of the pair of rotary assemblies DV and the rotation axis AX of the other rotary assembly DV are positioned on a straight line.

The pair of rotary assemblies DV have the same configuration. Therefore, one of the pair of rotary assemblies DV will be described below.

As illustrated in FIG. 3, the rotary assembly DV includes a main wheel 5 and a pair of driving force transmission devices 11A and 11B. Specifically, the rotary assembly DV includes a main wheel 5, a main shaft 9, a first drive unit DA, and a second drive unit DB. The first drive unit DA includes a driving force transmission device 11A. The second drive unit DB includes a driving force transmission device 11B. The driving force transmission device 11B has a structure in which the driving force transmission device 11A is horizontally reversed.

Specifically, the first drive unit DA and the second drive unit DB drive the main wheel 5. As a result, the main wheel 5 rotates about the rotation axis AX. Therefore, the rotation axis AX is also the rotation axis of the main wheel 5. The first drive unit DA comes into contact with the main wheel 5 from one side of the main wheel 5 in the axial direction AD to drive the main wheel 5. The second drive unit DB comes into contact with the main wheel 5 from the other side of the main wheel 5 in the axial direction AD to drive the main wheel 5. The main shaft 9 is disposed on the rotation axis AX.

The first drive unit DA further includes a toothed belt 13A, a pulley 15A, and a motor 17A. The motor 17A has a rotation shaft 171.

The second drive unit DB further includes a toothed belt 13B, a pulley 15B, and a motor 17B. The motor 17B has a rotation shaft 171.

Figure 4:
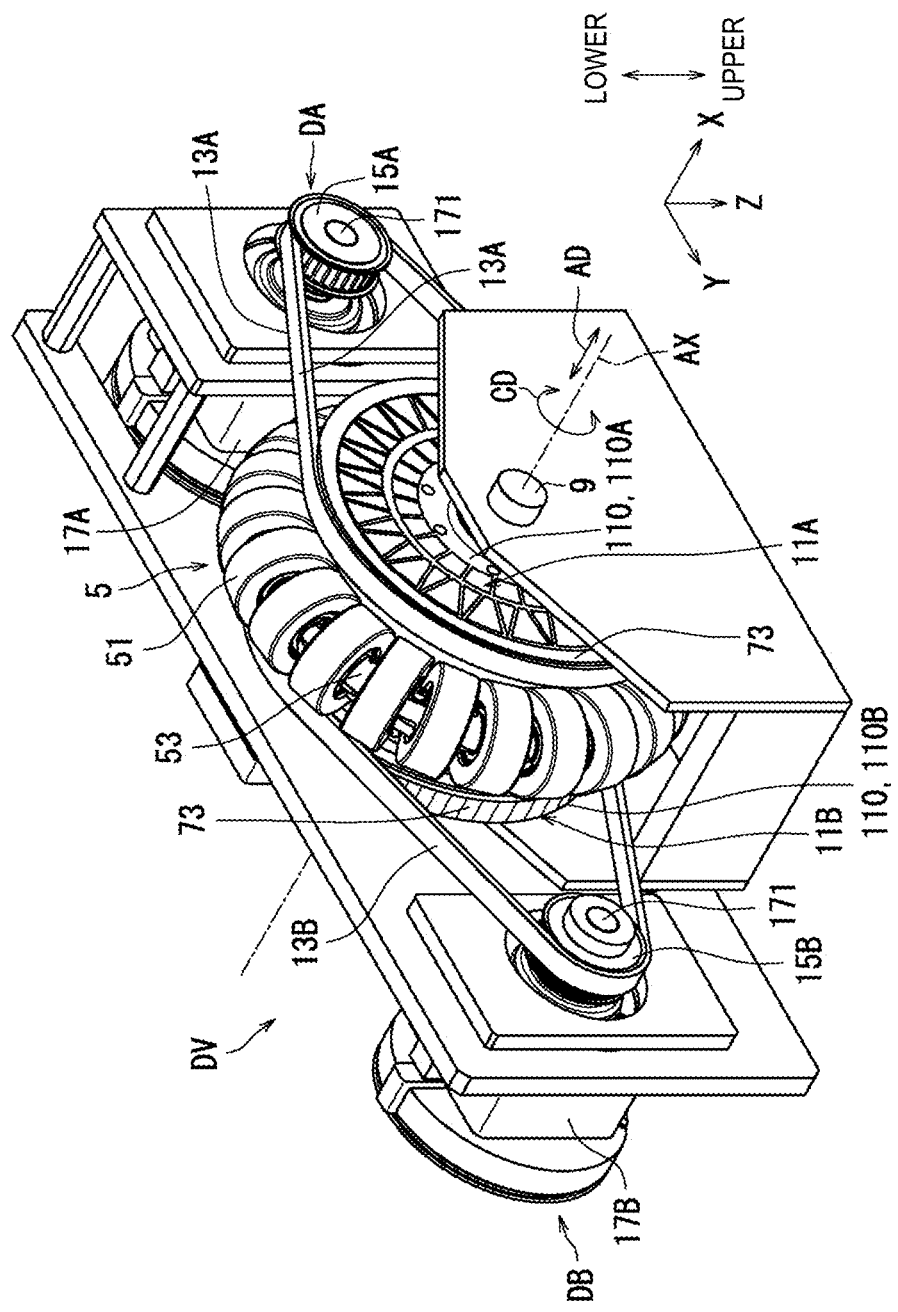
FIG. 4 is a perspective view illustrating a rotary assembly of the transport vehicle according to the present example embodiment.

Next, the rotary assembly DV will be described with reference to FIG. 4. FIG. 4 is a perspective view illustrating the rotary assembly DV. As illustrated in FIG. 4, in the rotary assembly DV, the driving force transmission device 11A of the first drive unit DA has a substantially disk shape. The driving force transmission device 11A is disposed on one side of the main wheel 5 in the axial direction AD. The driving force transmission device 11A is rotatably supported by the main shaft 9. The driving force transmission device 11A is driven by the motor 17A to rotate about the rotation axis AX. Therefore, the rotation axis AX is also the rotation axis of the driving force transmission device 11A. Then, the driving force transmission device 11A comes into contact with the main wheel 5 from one side of the main wheel 5 in the axial direction AD to drive the main wheel 5.

The pulley 15A is fixed to a rotation shaft 171 of the motor 17A. Then, the endless toothed belt 13A is bridged across the pulley 15A and a pulley portion 73 of the driving force transmission device 11A in a state of being applied with tension. When the rotation shaft 171 of the motor 17A rotates, the pulley 15A rotates, and the toothed belt 13A rotates. The driving force transmission device 11A rotates about the rotation axis AX. As a result, the driving force transmission device 11A transmits the driving force based on the rotational force to the main wheel 5. That is, the driving force transmission device 11A transmits the driving force of the motor 17A to the main wheel 5.

The driving force transmission device 11B of the second drive unit DB has a substantially disk shape. The driving force transmission device 11B is disposed on the other side of the main wheel 5 in the axial direction AD. The driving force transmission device 11B is rotatably supported by the main shaft 9. The driving force transmission device 11B is driven by the motor 17B to rotate about the rotation axis AX. Therefore, the rotation axis AX is also the rotation axis of the driving force transmission device 11B. Then, the driving force transmission device 11B comes into contact with the main wheel 5 from the other side of the main wheel 5 in the axial direction AD to drive the main wheel 5.

The configuration and operation of the toothed belt 13B, the pulley 15B, and the motor 17B of the second drive unit DB are similar to the configuration and operation of the toothed belt 13A, the pulley 15A, and the motor 17A of the first drive unit DA, respectively.

Figure 5:
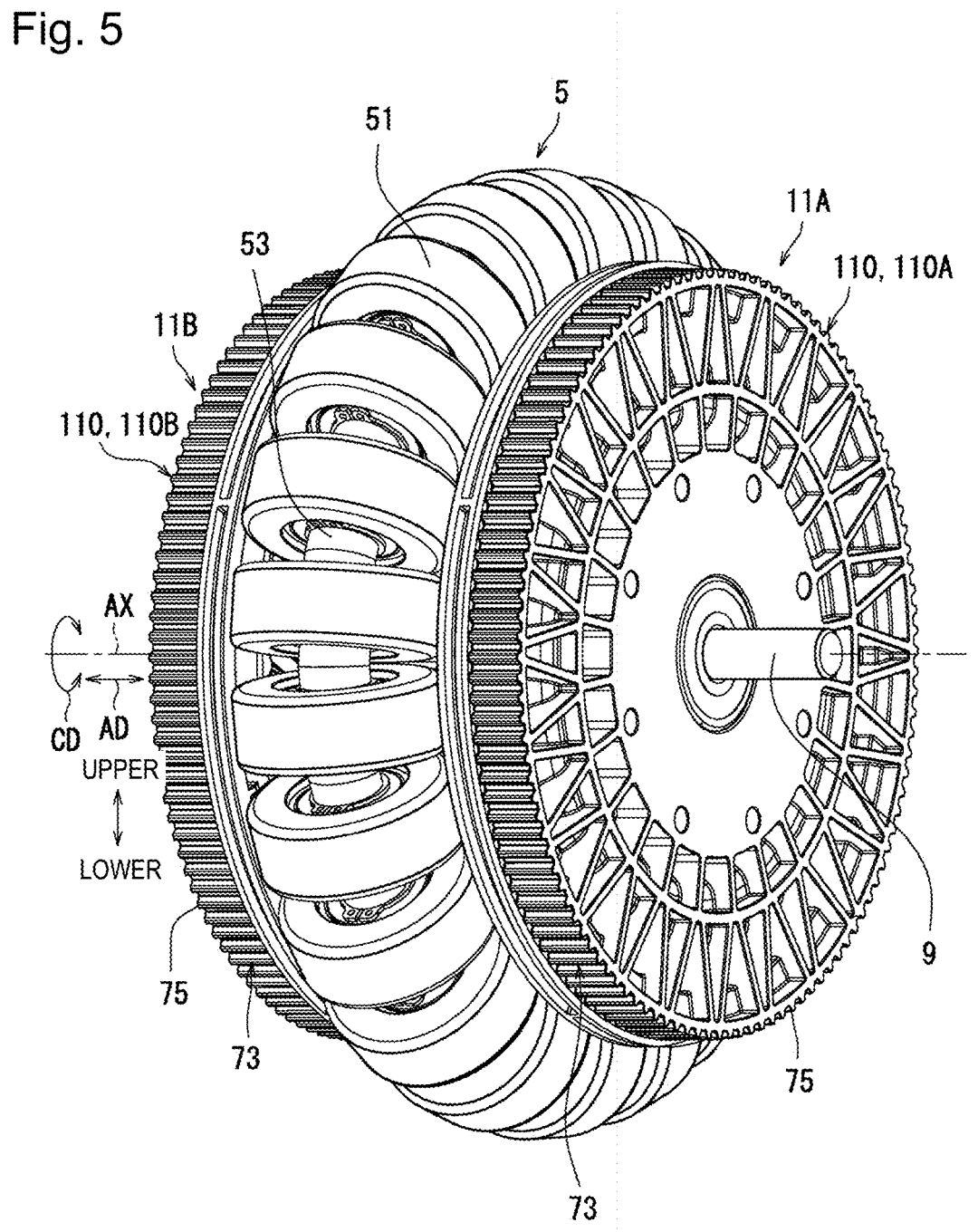

Next, the main wheel 5 will be described with reference to FIG. 5. FIG. 5 is a perspective view illustrating the main wheels 5 and the driving force transmission devices 11A and 11B. As illustrated in FIG. 5, the main wheel 5 includes a plurality of driven rollers 51 and a core body 53. The core body 53 extends along the circumferential direction CD about the rotation axis AX. The core body 53 has a substantially annular shape. Each of the plurality of driven rollers 51 has a substantially cylindrical shape. The plurality of driven rollers 51 are rotatably supported by the core body 53. Specifically, each of the plurality of driven rollers 51 is rotatable about an axis along a tangential direction of the core body 53 at its own position. Hereinafter, rotation of the driven roller 51 about an axis along the tangential direction of the core body 53 at its own position may be described as "spinning". The plurality of driven rollers 51 are disposed on the core body 53 at intervals along the circumferential direction CD. That is, the plurality of driven rollers 51 are disposed in a substantially annular shape.

When the main wheel 5 rotates about the rotation axis AX, each of the plurality of driven rollers 51 is rotationally moved along the circumferential direction CD. Hereinafter, the position of the driven roller 51 in the circumferential direction CD when the driven roller 51 is rotationally moved along the circumferential direction CD may be described as a "rotational movement position". Each of the plurality of driven rollers 51 comes into contact with the floor surface or the ground surface in accordance with the rotational movement position of the driven roller 51. Hereinafter, the contact of the driven roller 51 with the floor surface or the ground surface may be described as "grounding". A roller body of the driven roller 51 is made of rubber, for example.

Subsequently, the driving force transmission devices 11A and 11B will be described with reference to FIGS. 5 to 7. As illustrated in FIG. 5, the driving force transmission device 11A and the driving force transmission device 11B interpose the main wheel 5 from the axial direction AD. The driving force transmission device 11A and the driving force transmission device 11B are horizontally symmetrical with the main wheel 5 interposed therebetween. Furthermore, the driving force transmission device 11A and the driving force transmission device 11B rotatably support the main wheel 5 about the rotation axis AX.

The pair of driving force transmission devices 11A and 11B transmits the driving force to the main wheels 5 by rotating around the rotation axis AX. Specifically, one driving force transmission device 11A of the pair of driving force transmission devices 11A and 11B transmits the driving force to the main wheel 5 from one side in the axial direction AD along the rotation axis AX. The other driving force transmission device 11B of the pair of driving force transmission devices 11A and 11B has a structure symmetrical to the one driving force transmission device 11A with respect to the main wheel 5. The driving force transmission device 11B transmits the driving force to the main wheels 5 from the other side in the axial direction AD along the rotation axis AX.

The driving force transmission devices 11A and 11B include a roller arrangement portion 110. The roller arrangement portion 110 has a substantially disk shape. The roller arrangement portion 110 is made of a highly rigid material such as, for example, metal and hard plastic. The metal is, for example, aluminum.

The roller arrangement portion 110 may have the pulley portion 73. The pulley portion 73 is disposed along the outer circumferential edge of the roller arrangement portion 110. The pulley portion 73 has a substantially annular shape. The pulley portion 73 has a plurality of teeth 75. Each of the plurality of teeth 75 extends along the rotation axis AX. The plurality of teeth 75 are disposed at equal intervals along the circumferential direction CD. The pulley portion 73 may be provided as a member separate from the roller arrangement portion 110.

Hereinafter, the roller arrangement portion 110 of the driving force transmission device 11A may be referred to as "roller arrangement portion 110A", and the roller arrangement portion 110 of the driving force transmission device 11B may be referred to as "roller arrangement portion 110B". The configuration of the roller arrangement portion 110A and the configuration of the roller arrangement portion 110B are the same.

The toothed belt 13A (FIG. 4) is stretched across the pulley portion 73 and the pulley 15A (FIG. 4) of the roller arrangement portion 110A in a state of being applied with tension. Therefore, when the rotation shaft 171 of the motor 17A rotates, the roller arrangement portion 110A rotates around the rotation axis AX. The rotation axis AX is also a rotation axis of the roller arrangement portion 110A. Similarly, the toothed belt 13B (FIG. 4) is stretched across the pulley portion 73 and the pulley 15B (FIG. 4) of the roller arrangement portion 110B in a state of being applied with tension.

Figure 6:
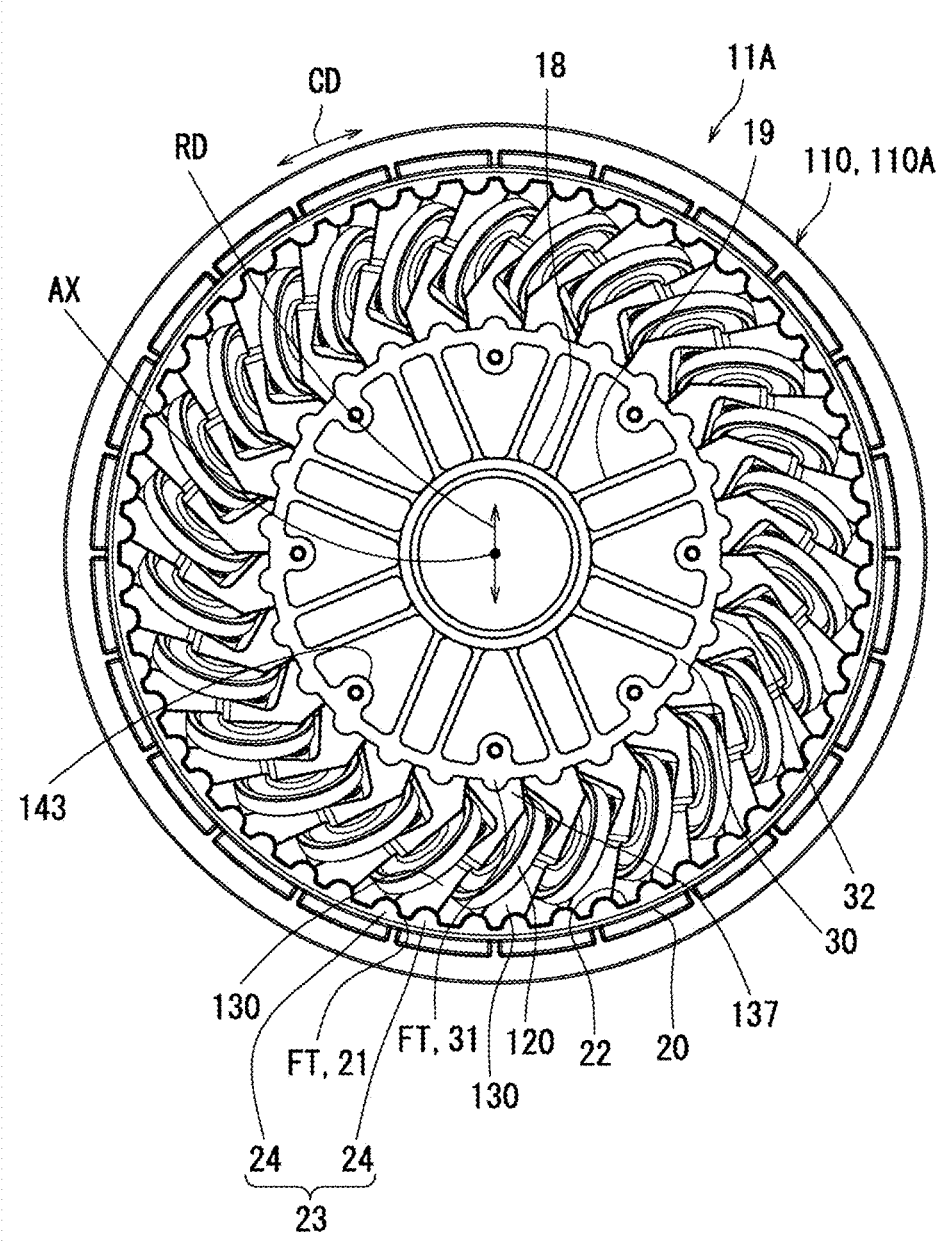
FIG. 6 is a plan view illustrating one driving force transmission device according to the present example embodiment.

FIG. 6 is a plan view illustrating the driving force transmission device 11A. In FIG. 6, the driving force transmission device 11A is viewed from the side of FIG. 5 where the main wheels 5 are disposed. As illustrated in FIG. 6, the driving force transmission device 11A further includes a plurality of drive rollers 120. That is, the driving force transmission device 11A includes N drive rollers 120. In the present specification, N represents an integer of 2 or more. In the example of FIG. 6, N=26.

The plurality of drive rollers 120 are disposed in the roller arrangement portion 110. The plurality of drive rollers 120 are disposed in a substantially annular shape. That is, the plurality of drive rollers 120 are disposed on the circumference along the circumferential direction CD. The plurality of drive rollers 120 are disposed rotationally symmetrical with respect to the rotation axis AX as a symmetry center line.

Figure 7:
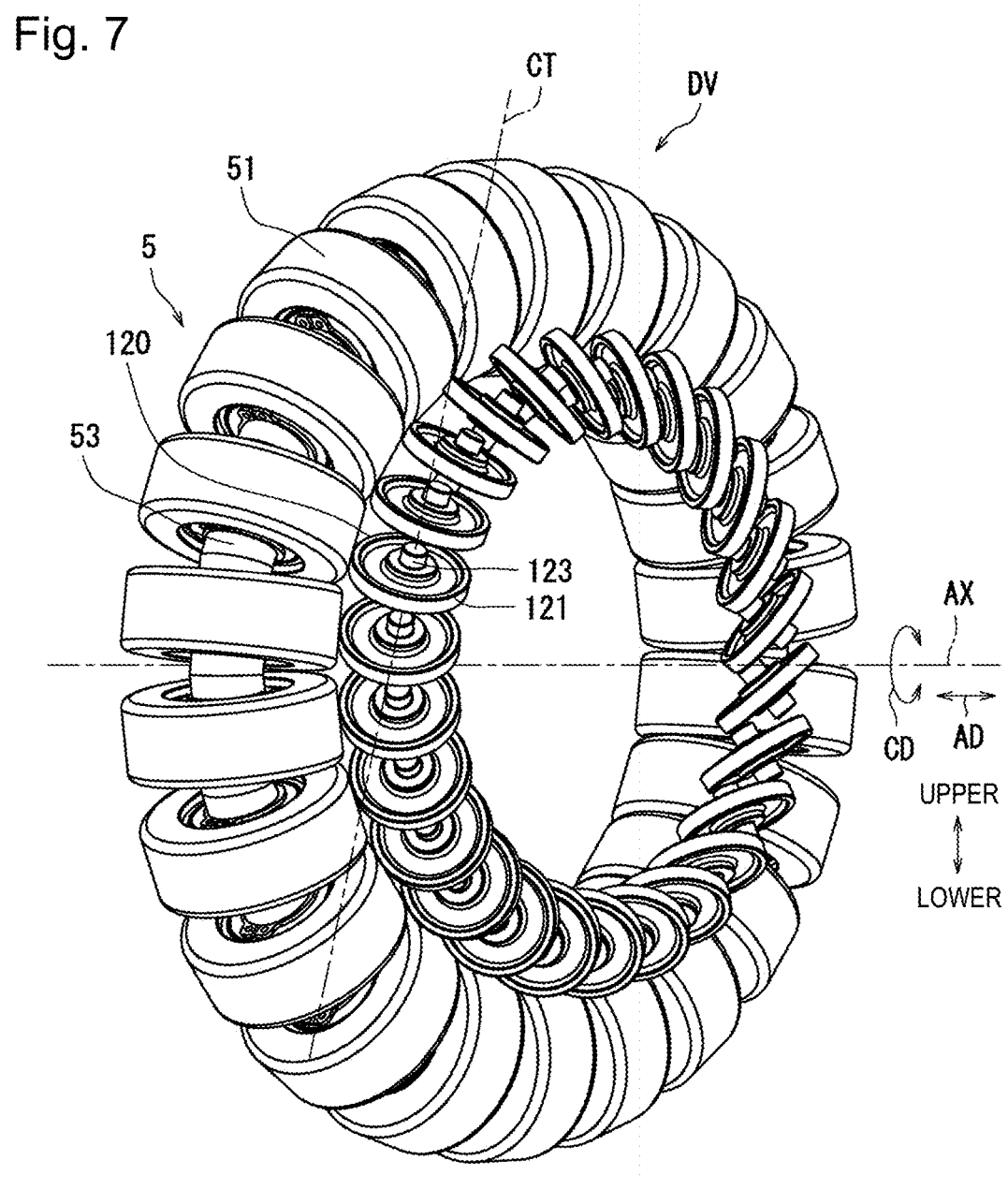
FIG. 7 is a perspective view illustrating a main wheel and a plurality of drive rollers according to the present example embodiment.

FIG. 7 is a perspective view illustrating the main wheel 5 and the plurality of drive rollers 120. FIG. 7 illustrates the drive roller 120 of the driving force transmission device 11A (FIG. 5). In FIG. 7, the roller arrangement portion 110A is omitted. In addition, the driving force transmission device 11B is not illustrated in order to simplify the drawing.

Each of the plurality of drive rollers 120 illustrated in FIG. 7 is rotationally moved along the circumferential direction CD when the roller arrangement portion 110A (FIG. 5) rotates around the rotation axis AX. Hereinafter, the position of the drive roller 120 in the circumferential direction CD when the drive roller 120 is rotationally moved along the circumferential direction CD may be described as a "rotational movement position".

Each of the plurality of drive rollers 120 comes into contact with any of the plurality of driven rollers 51 in accordance with the rotational movement position of the drive roller 120. Specifically, at least, the drive roller 120 comes into contact with the driven roller 51 positioned at the lowermost part and grounded. In this case, the outer circumferential surface of the drive roller 120 comes into contact with the outer circumferential surface of the driven roller 51. As a result, by the friction between the drive roller 120 and the driven roller 51, the driving force based on the rotation of the roller arrangement portion 110 is transmitted from the drive roller 120 to the driven roller 51. In other words, the plurality of drive rollers 120 transmit the driving force to the main wheel 5. Moreover, in other words, the plurality of drive rollers 120 transmit propulsion force to the main wheel 5.

Specifically, each of the plurality of drive rollers 120 is rotatably disposed around a center axis CT extending in a direction that is neither orthogonal nor parallel to the rotation direction of the main wheel 5 about the rotation axis AX. That is, the center axis CT of the plurality of drive rollers 120 is inclined with respect to the rotation direction of the main wheel 5 about the rotation axis AX, and has a twisting relationship with respect to the rotation axis AX. The center axis CT of the drive roller 120 three-dimensionally intersects with the rotation axis AX. In FIG. 7, for simplification of the drawing, only the center axis CT of one drive roller 120 is illustrated as an example.

More specifically, each of the plurality of drive rollers 120 includes a roller body 121 and a rotation shaft 123. The roller body 121 has a substantially disk shape. The roller body 121 is made of a highly rigid material such as, for example, metal and hard plastic. The rotation shaft 123 is disposed on the center axis CT. That is, the rotation shaft 123 extends along the center axis CT. The rotation shaft 123 has a substantially columnar shape. The rotation shaft 123 is fixed to the roller body 121. The rotation shaft 123 is made of a highly rigid material such as, for example, metal and hard plastic. The roller body 121 and the rotation shaft 123 are formed of a single member. The roller body 121 and the rotation shaft 123 may be separate members.

Subsequently, the control of the movement direction of the main wheel 5 will be described with reference to FIGS. 4 and 7. As illustrated in FIG. 4, the motor 17A and the motor 17B independently control the rotation direction and the rotation speed of the roller arrangement portion 110A and the rotation direction and the rotation speed of the roller arrangement portion 110B, thereby controlling the movement direction of the main wheel 5.

Specifically, when the motor 17A and the motor 17B are driven in the same rotation direction at the same rotation speed, the roller arrangement portion 110A and the roller arrangement portion 110B rotate at the same rotation speed in the same rotation direction, and the main wheel 5 rotates about the rotation axis AX. In this case, no difference occurs in rotation speed between the roller arrangement portion 110A and the roller arrangement portion 110B, and hence the driven roller 51 of the main wheel 5 does not spin, and the main wheel 5 moves forward or backward straight.

On the other hand, when the motor 17A and the motor 17B are driven in different rotation directions and/or at different rotation speeds, a rotation speed difference occurs between the roller arrangement portion 110A and the roller arrangement portion 110B.

In this case, a component force orthogonal to the circumferential force generated by the rotational force of the roller arrangement portion 110A acts on the contact surface between the drive roller 120 (FIG. 7) of the roller arrangement portion 110A and the driven roller 51 of the main wheel 5. In addition, a component force orthogonal to the circumferential force generated by the rotational force of the roller arrangement portion 110B acts on the contact surface between the drive roller 120 of the roller arrangement portion 110B and the driven roller 51 of the main wheel 5.

Therefore, the driven roller 51 spins without the main wheel 5 rotating about the rotation axis AX, or the driven roller 51 spins with the main wheel 5 rotating about the rotation axis AX. As a result, the main wheel 5 moves in the left-right direction or the oblique direction.

The driving force transmission device 11A and the driving force transmission device 11B support the main wheel 5 rotatably about the rotation axis AX by holding the main wheel 5 between the plurality of drive rollers 120 of the roller arrangement portion 110A (FIG. 7) and the plurality of drive rollers 120 of the roller arrangement portion 110B. In this case, the plurality of drive rollers 120 of the roller arrangement portion 110A and the plurality of drive rollers 120 of the roller arrangement portion 110B are disposed symmetrically with respect to the main wheel 5.

Next, the roller support portion 130 and the roller arrangement portion 110A of the driving force transmission device 11A will be described with reference to FIGS. 6, 8, and 9. As illustrated in FIG. 6, the driving force transmission device 11A further includes a plurality of roller support portions 130. That is, the driving force transmission device 11A includes N roller support portions 130. In the example of FIG. 6, N=26. The plurality of roller support portions 130 are disposed in the roller arrangement portion 110A. The material of the plurality of roller support portions 130 is preferably synthetic resin. In this case, the synthetic resin is, for example, plastic.

The plurality of roller support portions 130 rotatably supports the plurality of drive rollers 120. Specifically, two roller support portions 130 adjacent to each other in the circumferential direction CD are disposed with one drive roller 120 interposed therebetween. Two roller support portions 130 rotatably support one drive roller 120.

Figure 8:
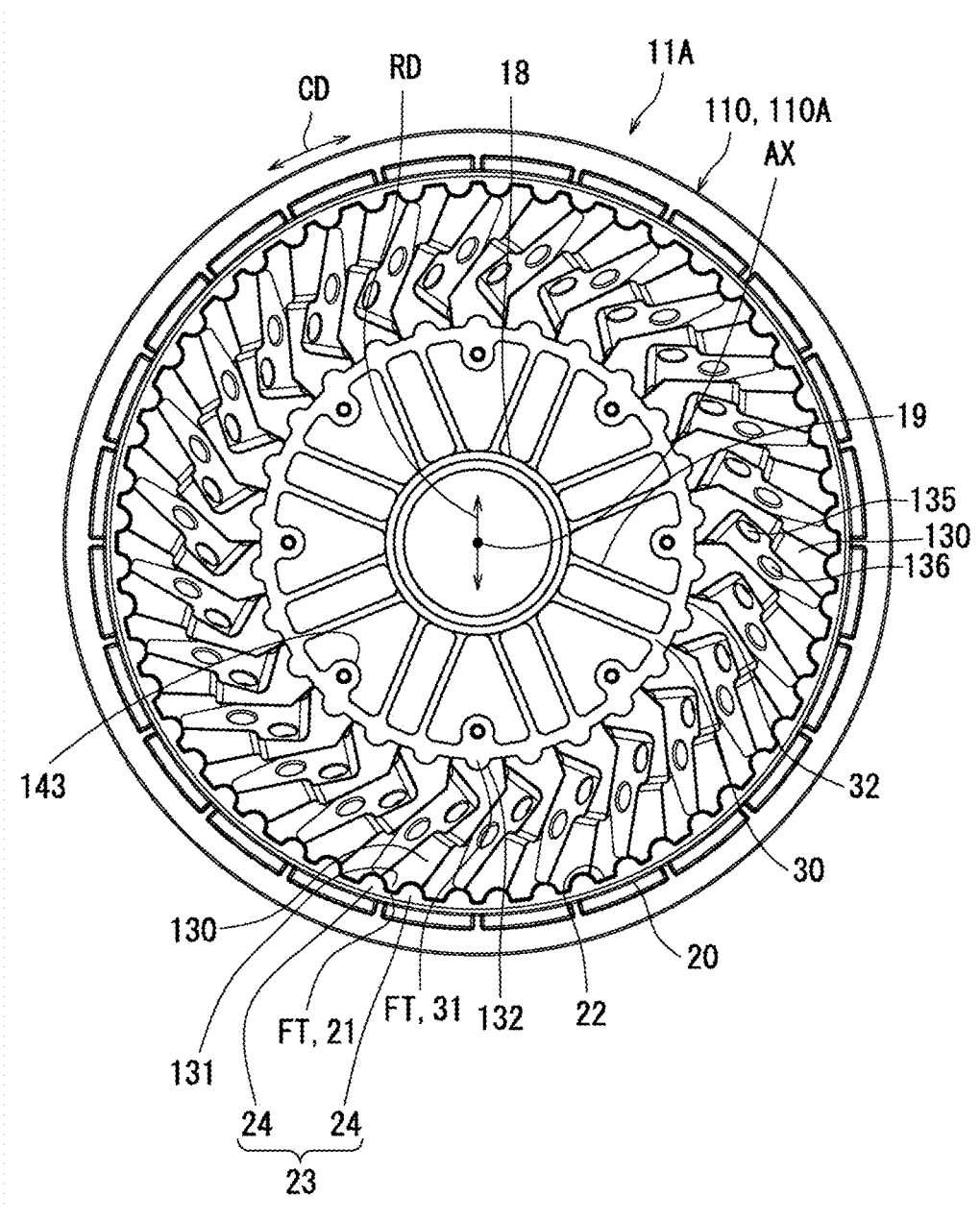
FIG. 8 is a plan view illustrating a roller arrangement portion and a plurality of roller support portions of one driving force transmission device according to the present example embodiment.

FIG. 8 is a plan view illustrating the roller arrangement portion 110A and the plurality of roller support portions 130 of the driving force transmission device 11A. In FIG. 8, the drive roller 120 is omitted in order to make the drawing easy to see. As illustrated in FIG. 8, the plurality of roller support portions 130 are disposed in a substantially annular shape. That is, the plurality of roller support portions 130 are disposed on the circumference along the circumferential direction CD. The plurality of roller support portions 130 are disposed rotationally symmetrical with respect to the rotation axis AX as a symmetry center line.

The roller arrangement portion 110A includes an outer frame portion 20 and an inner frame portion 30. The outer frame portion 20 is disposed along the circumferential direction CD around the rotation axis AX. The inner frame portion 30 is disposed along the circumferential direction CD around the rotation axis AX. The inner frame portion 30 is disposed inside the outer frame portion 20 in the radial direction RD. The plurality of roller support portions 130 are fitted between an inner circumferential surface 22 of the outer frame portion 20 and an outer circumferential surface 32 of the inner frame portion 30. Therefore, according to the present example embodiment, when the driving force transmission device 11A is manufactured, the plurality of roller support portions 130 are fitted between the inner circumferential surface 22 of the outer frame portion 20 and the outer circumferential surface 32 of the inner frame portion 30, whereby the plurality of roller support portions 130 can be easily assembled to the roller arrangement portion 110A. As a result, the driving force transmission device 11A can be easily manufactured. In the present example embodiment, a fixing member such as a bolt is not used when the plurality of roller support portions 130 are assembled to the roller arrangement portion 110A. Therefore, the number of components and assembly man-hours of the driving force transmission device 11A can be reduced.

Preferably, the roller arrangement portion 110A further includes a plurality of fitting portions FT. The plurality of fitting portions FT are disposed along the circumferential direction CD on at least one of the inner circumferential surface 22 of the outer frame portion 20 and the outer circumferential surface 32 of the inner frame portion 30. In the example of FIG. 8, the plurality of fitting portions FT are disposed along the circumferential direction CD on both the inner circumferential surface 22 of the outer frame portion 20 and the outer circumferential surface 32 of the inner frame portion 30. The plurality of roller support portions 130 are respectively fitted to the plurality of fitting portions FT. Therefore, according to the present example embodiment, the roller support portion 130 can be positioned in the circumferential direction CD by the fitting portion FT. In addition, torque generated when the roller arrangement portion 110A is driven to rotate around the rotation axis AX can be transmitted to the roller support portion 130 by the fitting portion FT. Therefore, the drive roller 120 supported by the roller support portion 130 can effectively transmit the driving force to the driven roller 51. For example, the roller support portion 130 is press-fitted into the fitting portion FT.

Specifically, the plurality of fitting portions FT includes a plurality of first fitting portions 21 and a plurality of second fitting portions 31. The plurality of first fitting portions 21 are disposed on the inner circumferential surface 22 of the outer frame portion 20 along the circumferential direction CD. The outer end portions 131 of the plurality of roller support portions 130 in the radial direction RD are fitted to the plurality of first fitting portions 21. The plurality of second fitting portions 31 are disposed on the outer circumferential surface 32 of the inner frame portion 30 along the circumferential direction CD. The inner end portions 132 of the plurality of roller support portions 130 in the radial direction RD are respectively fitted to the plurality of second fitting portions 31. According to the present example embodiment, displacement of the roller support portion 130 in the circumferential direction CD can be effectively suppressed by both the first fitting portion 21 and the second fitting portion 31.

Hereinafter, the end portion 131 of the roller support portion 130 will be referred to as an "outer end portion 131", and the end portion 132 of the roller support portion 130 will be referred to as an "inner end portion 132".

Figure 9:
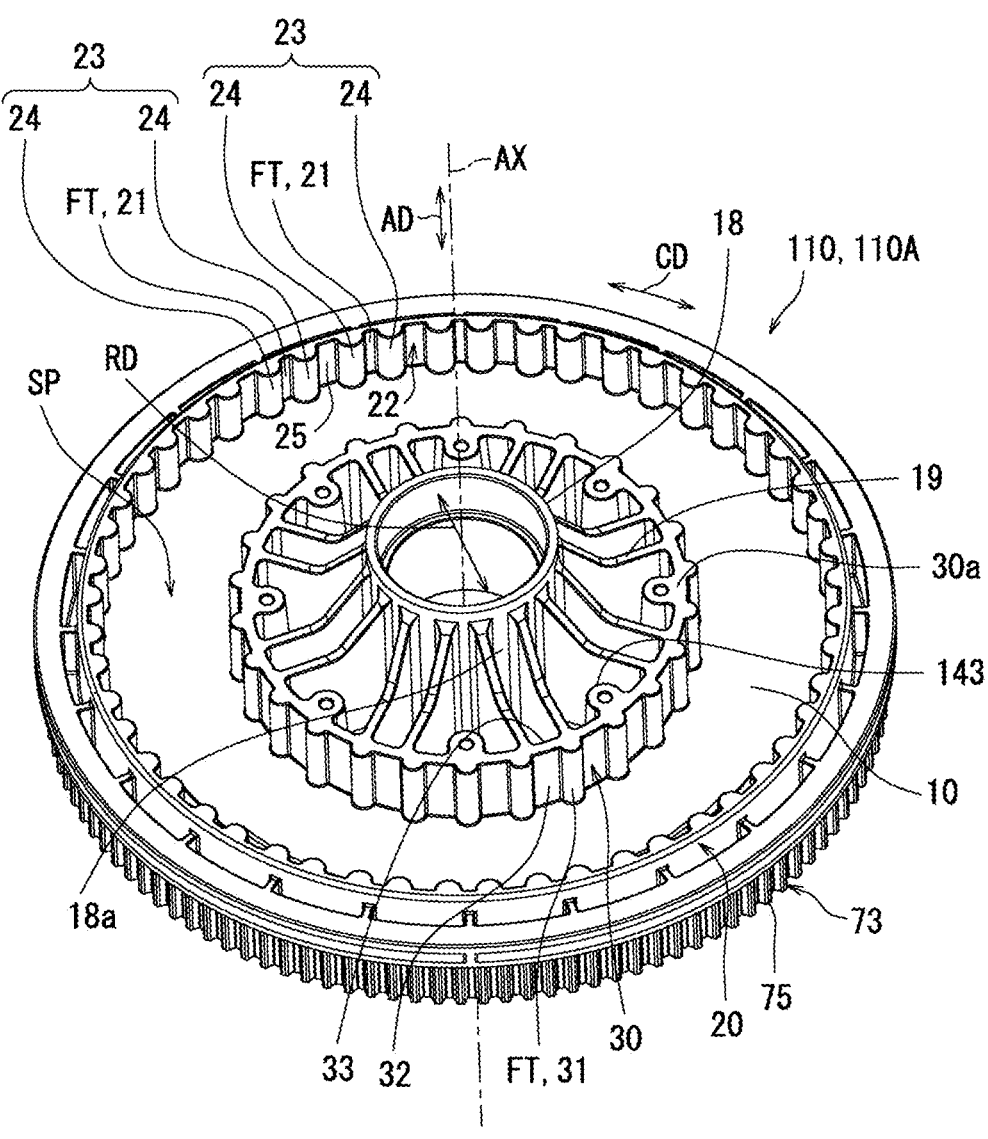
FIG. 9 is a perspective view illustrating the roller arrangement portion according to the present example embodiment.

FIG. 9 is a perspective view illustrating the roller arrangement portion 110A. As illustrated in FIG. 9, as an example, the first fitting portion 21 is recessed outward in the radial direction RD. That is, the first fitting portion 21 is a recess. The second fitting portion 31 protrudes outward in the radial direction RD. That is, the second fitting portion 31 is a protrusion. As described above, according to the present example embodiment, the first fitting portion 21 and the second fitting portion 31 can have a simple structure. As a result, the roller arrangement portion 110A can be easily manufactured.

In the example of FIG. 9, the second fitting portion 31 has a substantially semi-columnar shape. The second fitting portion 31 extends in the axial direction AD. The plurality of second fitting portions 31 are disposed at equal intervals along the circumferential direction CD on the outer circumferential surface 32 of the inner frame portion 30.

In the example of FIG. 9, the outer frame portion 20 further includes a plurality of protruding pair portions 23.

Each of the plurality of protruding pair portions 23 has a pair of protrusions 24. The pair of protrusions 24 is adjacent to each other in the circumferential direction CD. The plurality of protruding pair portions 23 are disposed on the inner circumferential surface 22 of the outer frame portion 20 along the circumferential direction CD. Specifically, the plurality of protruding pair portions 23 is disposed at equal intervals along the circumferential direction CD. Each of the protrusions 24 protrudes inward in the radial direction RD from the inner circumferential surface 22. In the example of FIG. 9, the protrusion 24 has a substantially semi-columnar shape. The protrusion 24 extends in the axial direction AD.

In particular, in the example of FIG. 9, the first fitting portion 21 is a recess between one protrusion 24 and the other protrusion 24 of the pair of protrusions 24.

It is preferable that outer frame portion 20 further includes a plurality of recesses 25. Each recess 25 is recessed outward in the radial direction RD. The recess 25 is located between the first fitting portion 21 and the first fitting portion 21 adjacent in the circumferential direction DC. According to this preferred example, the weight of the roller arrangement portion 110A can be reduced as compared with the case where the recess 25 is not provided.

Specifically, the plurality of recesses 25 are disposed along the circumferential direction CD on the inner circumferential surface 22 of the outer frame portion 20. More specifically, the plurality of recesses 25 are disposed at equal intervals along the circumferential direction CD. In addition, the recess 25 is located between the protruding pair portion 23 and the protruding pair portion 23 adjacent to each other in the circumferential direction CD. That is, the recess 25 is located between the protrusion 24 of one pair of protruding pair portions 23 and the protrusion 24 of the other pair of protruding pair portions 23 adjacent to each other in the circumferential direction CD. In this case, the protrusion 24 of one protruding pair portion 23 is the protrusion 24 closer to the other protruding pair portion 23 of the pair of protrusions 24 of one protruding pair portion 23. In addition, the protrusion 24 of the other protruding pair portion 23 is a protrusion 24 closer to one protruding pair portion 23 of the pair of protrusions 24 of the other protruding pair portion 23.

In the example of FIG. 9, the width (hereinafter, the width of the recess 25) of the recess 25 in the circumferential direction CD is larger than the width (hereinafter, the width of the first fitting portion 21) of the first fitting portion 21 in the circumferential direction CD. However, the width of the recess 25 may be smaller than the width of the first fitting portion 21 or may be the same as the width of the first fitting portion 21.

For example, the width of the first fitting portion 21 is determined based on the width of the roller body 121 of the drive roller 120, the thickness of the roller support portion 130, and the strength and manufacturability of the inner circumferential surface 22 of the outer frame portion 20. For example, as long as the first fitting portion 21 can be manufactured while securing the strength of the first fitting portion 21, the width of the first fitting portion 21 can be reduced. When the width of the first fitting portion 21 is determined, the width of the recess 25 is determined by the width of the first fitting portion 21 and the length of the outer frame portion 20 in the circumferential direction CD.

Specifically, the roller arrangement portion 110A further includes a base portion 10, a hub 18, and a plurality of ribs 19. The base portion 10 extends outward in the radial direction RD with respect to the rotation axis AX. Specifically, the base portion 10 expands outward in the radial direction RD around the hub 18. That is, the base portion 10 has a substantially disk shape having a hole at the center.

The hub 18 has a substantially cylindrical shape. The hub 18 surrounds the rotation axis AX in the circumferential direction CD. The rotation axis AX passes through the center of the hub 18. The main shaft 9 (FIG. 5) is inserted and disposed in the hub 18.

The inner frame portion 30 is disposed inside the outer frame portion 20 in the radial direction RD. Further, the inner frame portion 30 protrudes from the base portion 10 in the axial direction AD toward the main wheel 5 (FIG. 5). The inner frame portion 30 has a substantially cylindrical shape. Each rib 19 connects an outer circumferential surface 18a of the hub 18 and an inner circumferential surface 33 of the inner frame portion 30. Each rib 19 has a substantially flat plate shape. The plurality of ribs 19 radially extend outward in the radial direction RD from the outer circumferential surface 18a of the hub 18.

The outer frame portion 20 protrudes from the base portion 10 in the axial direction AD along the rotation axis AX toward the main wheel 5 (FIG. 5). The outer frame portion 20 has a substantially cylindrical shape. The pulley portion 73 is located outside the outer frame portion 20 in the radial direction RD.

The base portion 10, the outer frame portion 20, the inner frame portion 30, and the plurality of fitting portions FT are formed of a single member. Therefore, according to the present example embodiment, the number of components of the driving force transmission device 11A can be reduced. As a result, the driving force transmission device 11A can be easily manufactured. Preferably, the base portion 10, the outer frame portion 20, the inner frame portion 30, the plurality of fitting portions FT, and the pulley portion 73 are formed of a single member. Therefore, the number of components of the driving force transmission device 11A can be further reduced. As a result, the driving force transmission device 11A can be more easily manufactured.

In the example of FIG. 9, the base portion 10, the outer frame portion 20, the inner frame portion 30, the plurality of fitting portions FT, the hub 18, and the plurality of ribs 19 are configured by a single member.

The roller arrangement portion 110A has a roller arrangement space SP. The plurality of roller support portions 130 and the plurality of drive rollers 120 illustrated in FIG. 6 are disposed in the roller arrangement space SP. The roller arrangement space SP is a substantially annular space defined by the inner circumferential surface 22 of the outer frame portion 20, the outer circumferential surface 32 of the inner frame portion 30, and the base portion 10.

Figure 10:
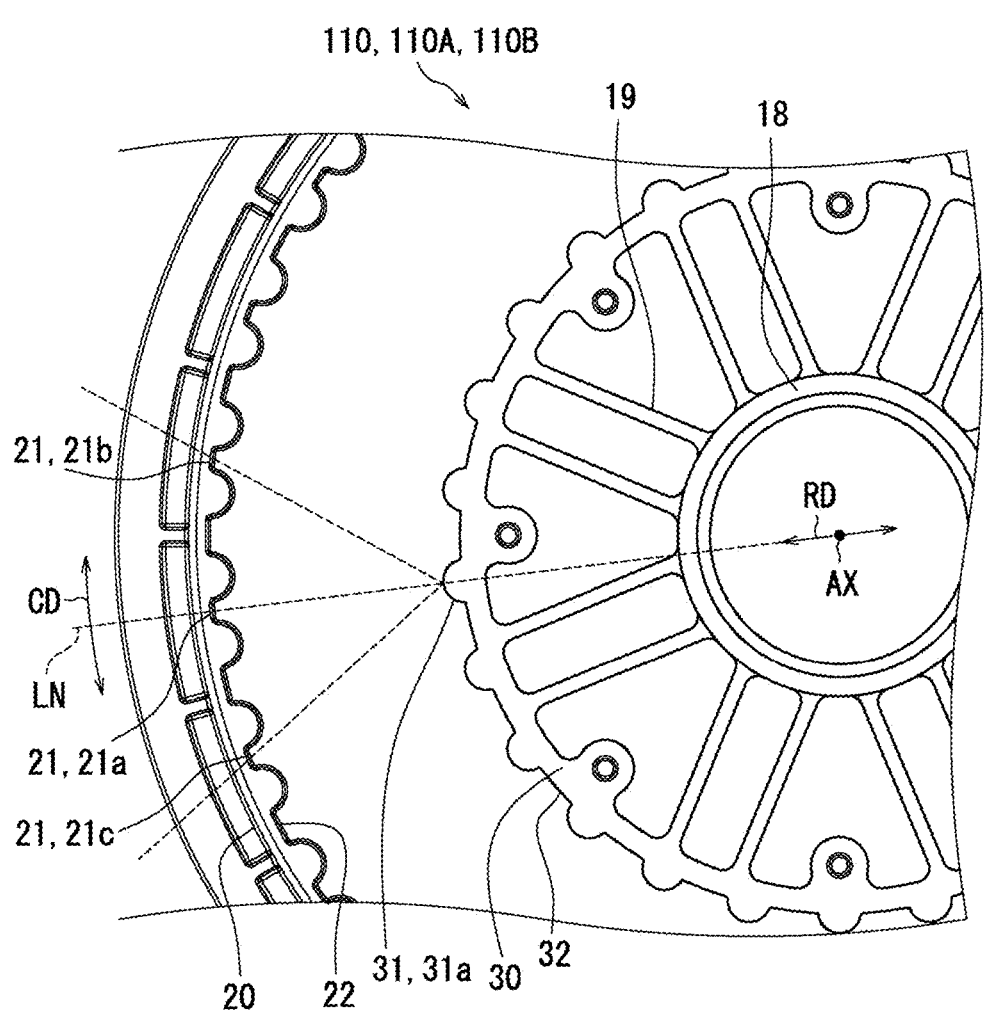
FIG. 10 is an enlarged plan view illustrating a portion of the roller arrangement portion according to the present example embodiment.

Next, the roller arrangement portion 110, the drive roller 120, and the roller support portion 130 will be described with reference to FIGS. 10 and 11. FIG. 10 is an enlarged plan view illustrating a portion of the roller arrangement portion 110. As illustrated in FIG. 10, in the roller arrangement portion 110, a first fitting portion 21a of the plurality of first fitting portions 21 and a second fitting portion 31a of the plurality of second fitting portions 31 face each other in the radial direction RD. A first fitting portion 21b of the plurality of first fitting portions 21 is disposed adjacent to the first fitting portion 21a on one side in the circumferential direction CD, the first fitting portion 21a facing the second fitting portion 31a in the radial direction RD. A first fitting portion 21c of the plurality of first fitting portions 21 is disposed adjacent to the first fitting portion 21a on the other side in the circumferential direction CD, the first fitting portion 21a facing the second fitting portion 31a in the radial direction RD. The first fitting portion 21b and the first fitting portion 21c are disposed symmetrically with respect to the first fitting portion 21a and the second fitting portion 31a facing each other in the radial direction RD.

Therefore, in the roller arrangement portion 110, the plurality of roller support portions 130 can be disposed to be inclined to one side in the circumferential direction CD, or the plurality of roller support portions 130 can be disposed to be inclined to the other side in the circumferential direction CD. As a result, when the main wheel 5 is driven while being sandwiched between the pair of driving force transmission devices 11A and 11B (FIG. 5), the roller arrangement portions 110A and 110B of the pair of driving force transmission devices 11A and 11B can have the same structure. Therefore, since the metal mold can be shared by the pair of roller arrangement portions 110A and 110B, the manufacturing cost of the driving force transmission devices 11A and 11B can be reduced.

Specifically, in plan view, the first fitting portion 21b located on one side in the circumferential direction CD of the first fitting portion 21a on the symmetry axis LN and the first fitting portion 21c located on the other side in the circumferential direction CD of the first fitting portion 21a are line-symmetric with respect to the symmetry axis LN. The symmetry axis LN is an imaginary line passing through the first fitting portion 21a and the second fitting portion 31a facing each other in the radial direction RD. The symmetry axis LN is orthogonal to the rotation axis AX.

Figure 11A:
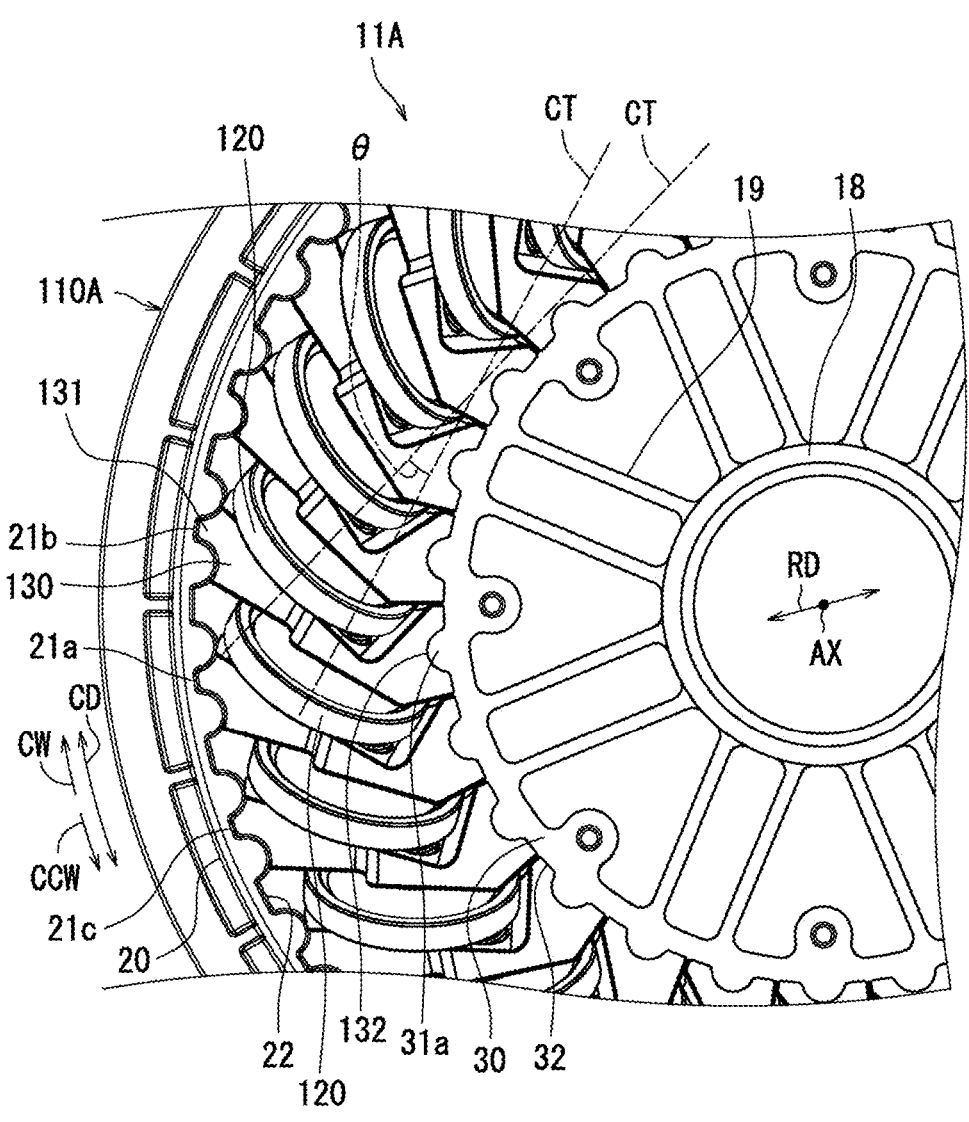
FIG. 11A is an enlarged plan view illustrating a portion of the roller arrangement portion, a portion of the plurality of roller support portions, and a portion of a plurality of drive rollers of one driving force transmission device according to the present example embodiment.
Figure 11B:
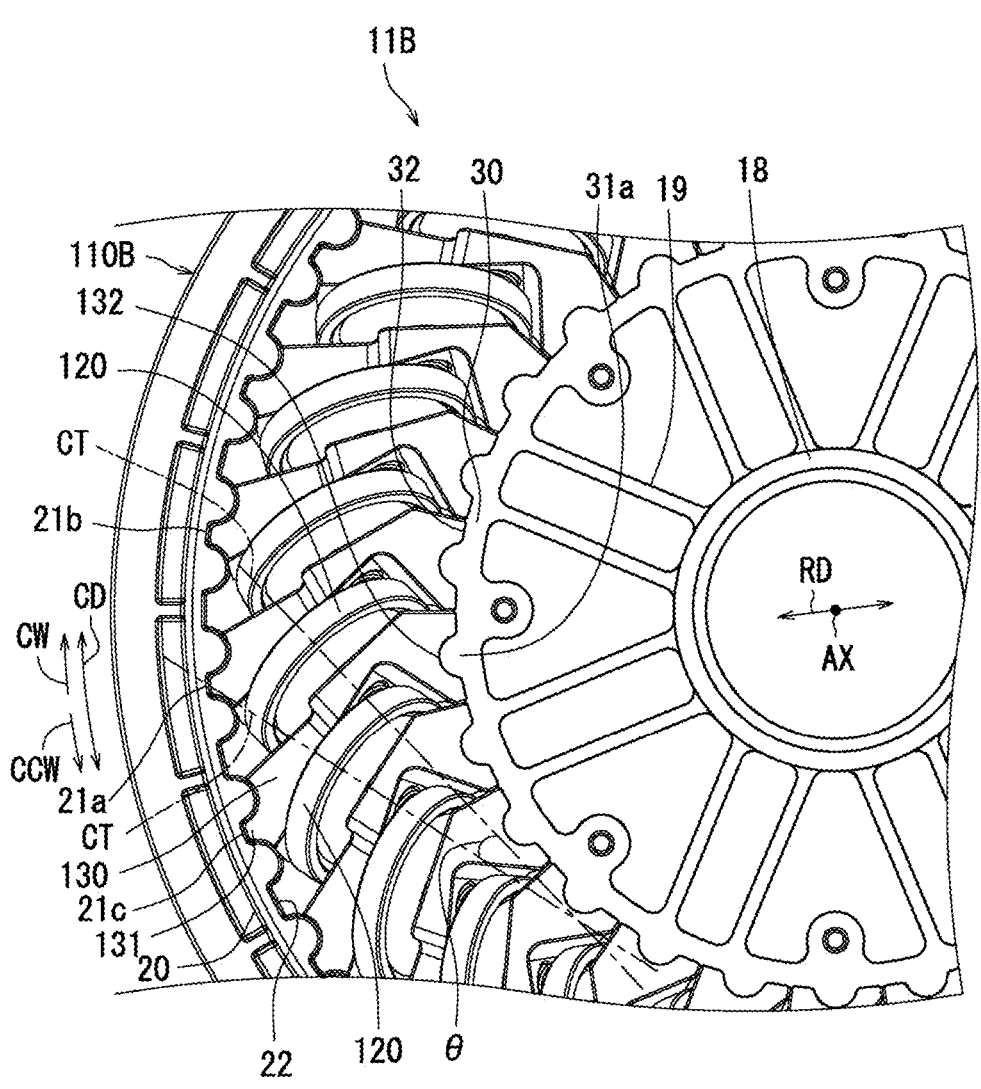
FIG. 11B is an enlarged plan view illustrating a portion of the roller arrangement portion, a portion of the plurality of roller support portions, and a portion of the plurality of drive rollers of the other driving force transmission device according to the present example embodiment.

FIG. 11A is an enlarged plan view illustrating a portion of the roller arrangement portion 110A, a portion of the plurality of roller support portions 130, and a portion of the plurality of drive rollers 120 of the driving force transmission device 11A. FIG. 11B is an enlarged plan view illustrating a portion of the roller arrangement portion 110B, a portion of the plurality of roller support portions 130, and a portion of the plurality of drive rollers 120 of the driving force transmission device 11B.

As illustrated in FIGS. 11A and 11B, the configuration of the roller arrangement portion 110A and the configuration of the roller arrangement portion 110B are the same.

In particular, as illustrated in FIG. 11A, in the driving force transmission device 11A, each roller support portion 130 is disposed in the roller arrangement portion 110A to be inclined in the clockwise direction CW in plan view. In other words, the inner end portion 132 of the roller support portion 130 is fitted into the second fitting portion 31a, and the outer end portion 131 of the roller support portion 130 is fitted into the first fitting portion 21b located on one side in the circumferential direction CD of the first fitting portion 21a. In other words, the inner end portion 132 is fitted into the second fitting portion 31a, and the outer end portion 131 is fitted into the first fitting portion 21b located in the clockwise direction CW with respect to the first fitting portion 21a.

On the other hand, as illustrated in FIG. 11B, in the driving force transmission device 11B, each roller support portion 130 is disposed in the roller arrangement portion 110B to be inclined in the counterclockwise direction CCW in plan view. In other words, the inner end portion 132 of the roller support portion 130 is fitted into the second fitting portion 31a, and the outer end portion 131 of the roller support portion 130 is fitted into the first fitting portion 21c located on the other side in the circumferential direction CD of the first fitting portion 21a. In other words, the inner end portion 132 is fitted into the second fitting portion 31a, and the outer end portion 131 is fitted into the first fitting portion 21c located in the counterclockwise direction CCW with respect to the first fitting portion 21a.

As illustrated in FIGS. 11A and 11B, the outer end portion 131 of the roller support portion 130 is a protrusion protruding outward in the radial direction RD. The inner end portion 132 is a recess recessed outward in the radial direction RD. The configuration of the drive roller 120 of the driving force transmission device 11A is the same as the configuration of the drive roller 120 of the driving force transmission device 11B. Furthermore, the roller support portion 130 of the driving force transmission device 11A and the roller support portion 130 of the driving force transmission device 11B are mirror-symmetric.

Furthermore, as illustrated in FIG. 11A, in the driving force transmission device 11A, each drive roller 120 is inclined in the clockwise direction CW and is supported by the roller support portion 130 in plan view. On the other hand, as illustrated in FIG. 11B, in the driving force transmission device 11B, each drive roller 120 is inclined in the counterclockwise direction CCW and is supported by the roller support portion 130 in plan view.

Furthermore, as illustrated in FIGS. 11A and 11B, in the two drive rollers 120 adjacent to each other in the circumferential direction CD, the center axis CT of one drive roller 120 and the center axis CT of the other drive roller 120 intersect each other so as to form an acute angle θ in plan view. In plan view, the center axis CT of the one drive roller 120 and the center axis CT of the other drive roller 120 extend outward in the radial direction RD toward a side away from the hub 18.

Figure 12:
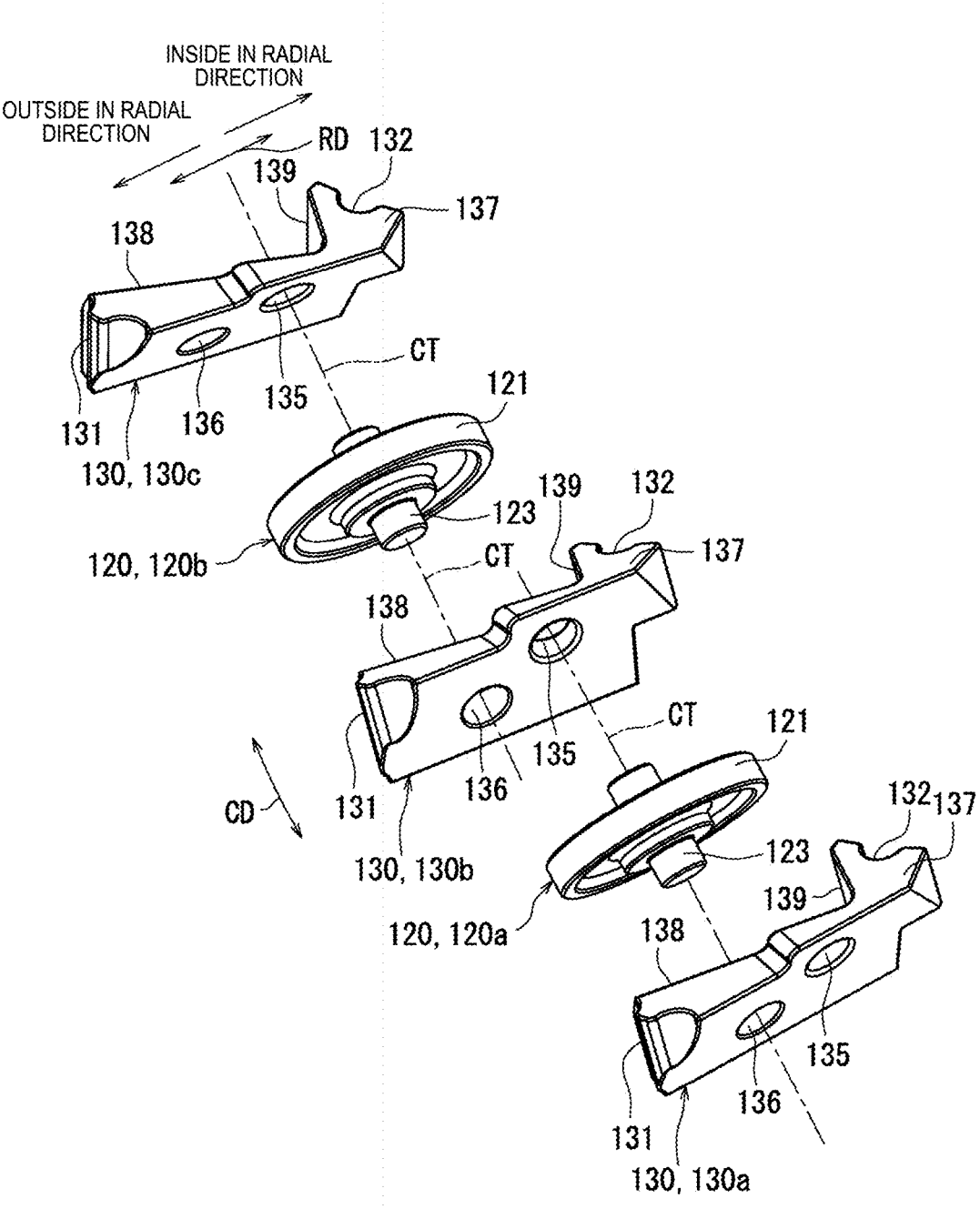
FIG. 12 is an exploded perspective view illustrating three roller support portions and two drive rollers according to the present example embodiment.

Next, the drive roller 120 and the roller support portion 130 will be described with reference to FIG. 12. FIG. 12 is an exploded perspective view illustrating three roller support portions 130 and two drive rollers 120 in the driving force transmission device 11A (FIG. 6). As illustrated in FIG. 12, each roller support portion 130 further includes an inner through-hole 135 and an outer through-hole 136. The inner through-hole 135 penetrates the roller support portion 130 in the circumferential direction CD. The inner through-hole 135 is located inside the outer through-hole 136 in the radial direction RD. The inner through-hole 135 is provided at a position farther from the base portion 10 (FIG. 13 described later) than the outer through-hole 136. The outer through-hole 136 penetrates the roller support portion 130 in the circumferential direction CD.

Specifically, the roller support portion 130 includes a body portion 138 and a protruding portion 139. The body portion 138 has a substantially flat plate shape. The body portion 138 extends along the radial direction RD. The body portion 138 has an outer end portion 131. The body portion 138 has an inner through-hole 135 and an outer through-hole 136. The protruding portion 139 protrudes in the circumferential direction CD from the body portion 138 inside the body portion 138 in the radial direction RD. The protruding portion 139 has an inner end portion 132.

A drive roller 120a is disposed between a roller support portion 130a and a roller support portion 130b adjacent to each other in the circumferential direction CD. The material of the roller support portions 130a and 130b is synthetic resin. The synthetic resin is, for example, plastic. The rotation shaft 123 of the drive roller 120a rotates while being in contact with the roller support portion 130a and the roller support portion 130b adjacent in the circumferential direction CD. That is, in the present example embodiment, since the roller support portions 130a and 130b function as bearings, the number of components of the driving force transmission device 11A can be reduced as compared with the case where the bearings are separately provided.

On the other hand, a drive roller 120b is disposed between the roller support portion 130c and the roller support portion 130b adjacent to each other in the circumferential direction CD. The material of the roller support portions 130c and 130b is synthetic resin. The synthetic resin is, for example, plastic. The rotation shaft 123 of the drive roller 120b rotates while being in contact with the roller support portion 130c and the roller support portion 130b adjacent in the circumferential direction CD. That is, the roller support portions 130c and 130b function as bearings.

As described above with reference to FIG. 12, according to the present example embodiment, one roller support portion 130b can be used as a bearing for the two drive rollers 120b and 120a adjacent to each other in the circumferential direction CD. Therefore, the number of components of the driving force transmission device 11A can be reduced as compared with a case where a pair of bearings is provided for each of the plurality of drive rollers 120. Specifically, it is sufficient to provide ½ of the roller support portions 130 with respect to the number of bearings in a case where a pair of bearings is provided for each of the plurality of drive rollers 120. That is, one roller support portion 130 supports two drive rollers 120 adjacent to each other in the circumferential direction CD. The same applies to the driving force transmission device 11B (FIG. 11B).

Specifically, one side of the rotation shaft 123 of the drive roller 120a in the circumferential direction CD is inserted and disposed in the outer through-hole 136 of the roller support portion 130a. In addition, the other side of the rotation shaft 123 of the drive roller 120a in the circumferential direction CD is inserted and disposed in the inner through-hole 135 of the roller support portion 130b. On the other hand, one side of the rotation shaft 123 of the drive roller 120b in the circumferential direction CD is inserted and disposed in the outer through-hole 136 of the roller support portion 130b. In addition, the other side of the rotation shaft 123 of the drive roller 120b in the circumferential direction CD is inserted and disposed in the inner through-hole 135 of the roller support portion 130c. The same applies to the driving force transmission device 11B (FIG. 11B).

That is, the inner through-hole 135 of the roller support portion 130b supports the rotation shaft 123 of the drive roller 120a located on one side in the circumferential direction CD of the roller support portion 130b. The outer through-hole 136 of the roller support portion 130b supports the rotation shaft 123 of the drive roller 120b located on the other side in the circumferential direction CD of the roller support portion 130b. The same applies to the driving force transmission device 11B (FIG. 11B).

Figure 13:
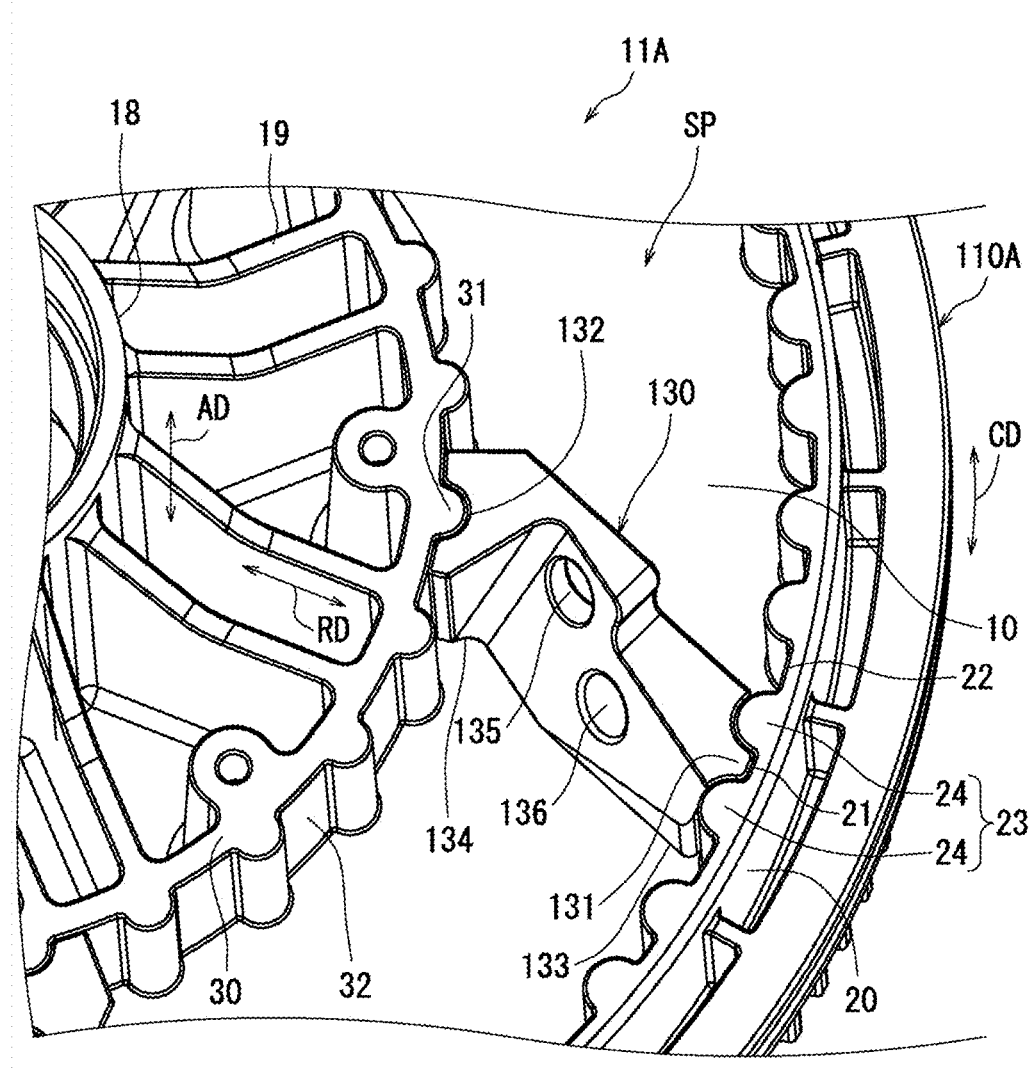
FIG. 13 is an enlarged perspective view illustrating a portion of the roller arrangement portion and one roller support portion of one driving force transmission device according to the present example embodiment.

Next, the roller arrangement portion 110A and the roller support portion 130 will be described with reference to FIG. 13. FIG. 13 is an enlarged perspective view illustrating a portion of the roller arrangement portion 110A and one roller support portion 130. As illustrated in FIG. 13, at least the outer bottom portion 133 and the inner bottom portion 134 of the roller support portion 130 are in contact with the surface of the base portion 10. Therefore, the roller support portion 130 is positioned in the axial direction AD. The outer bottom portion 133 is the outside portion in the radial direction RD of the bottom portion of the roller support portion 130. The inner bottom portion 134 is the inside portion in the radial direction RD of the bottom portion of the roller support portion 130.

The outer end portion 131 of the roller support portion 130 has a shape conforming to the shape of the first fitting portion 21. The inner end portion 132 of the roller support portion 130 has a shape conforming to the shape of the second fitting portion 31.

Figure 14:
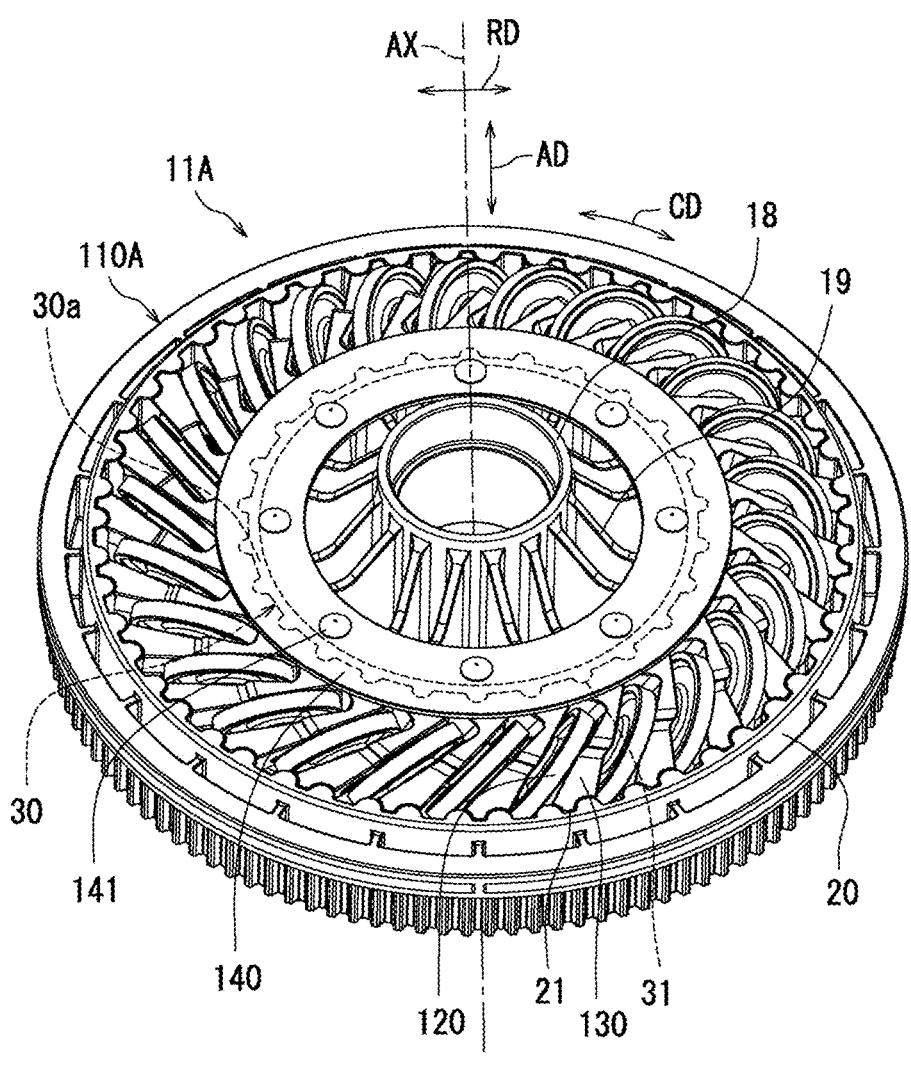
FIG. 14 is a perspective view illustrating a state in which a contact portion is attached to the driving force transmission device according to the present example embodiment.

Next, a preferred example of the driving force transmission device 11A will be described with reference to FIGS. 6, 9, and 14. FIG. 14 is a perspective view illustrating a state in which a contact portion 140 is attached to the driving force transmission device 11A.

As illustrated in FIG. 14, the driving force transmission device 11A preferably further includes the contact portion 140. The contact portion 140 faces a portion of each of the plurality of roller support portions 130 in the axial direction AD. In addition, the contact portion 140 contacts a portion of each of the plurality of roller support portions 130. Therefore, according to the present example embodiment, the roller support portion 130 can be positioned in the axial direction AD. As a result, the displacement of the roller support portion 130 in the axial direction AD can be effectively suppressed. Similarly to the driving force transmission device 11A, the driving force transmission device 11B preferably includes the contact portion 140.

Specifically, the driving force transmission device 11A preferably includes a plurality of fixing members 141. The fixing member 141 is, for example, a screw. As illustrated in FIG. 9, the inner frame portion 30 preferably has a plurality of fixing portions 143. The plurality of fixing portions 143 are disposed on the circumference along the circumferential direction CD. Each of the plurality of fixing portions 143 protrudes inward in the radial direction RD from the inner circumferential surface 33 of the inner frame portion 30. In the example of FIG. 9, the fixing portion 143 has a substantially semi-columnar shape. The fixing portion 143 extends in the axial direction AD.

In the example of FIG. 14, the contact portion 140 has a substantially annular shape having a substantially flat plate shape. The contact portion 140 is disposed inside the outer frame portion 20 in the radial direction RD. The contact portion 140 is disposed outside the hub 18 in the radial direction RD. The contact portion 140 is in contact with an end face 30a of the inner frame portion 30 in the axial direction AD. The contact portion 140 is fixed to the plurality of fixing portions 143 by the plurality of fixing members 141. Specifically, the contact portion 140 is fixed to the roller arrangement portion 110A by screwing the plurality of fixing members 141 into the plurality of fixing portions 143 via the contact portion 140. The contact portion 140 is separated from the plurality of drive rollers 120.

In the example of FIG. 14, the contact portion 140 faces an inner end face 137 (FIG. 6) of each of the plurality of roller support portions 130 in the axial direction AD. Then, the contact portion 140 contacts the inner end face 137. As illustrated in FIG. 6, the inner end face 137 indicates a surface of an inner end in the radial direction RD among the end faces in the axial direction AD of the roller support portion 130. Specifically, as illustrated in FIG. 12, the inner end face 137 is an end face of the protruding portion 139 of the roller support portion 130 in the axial direction AD.

As described above with reference to FIGS. 1 to 14, according to the present example embodiment, the roller arrangement portions 110A and 110B of the pair of driving force transmission devices 11A and 11B can have the same structure. Therefore, the pair of roller arrangement portions 110A and 110B can share the metal mold. As a result, the manufacturing cost of the rotary assembly DV (FIG. 4) can be reduced.

A first fitting portion 21x and a second fitting portion 31x according to a modification of the present example embodiment will be described with reference to FIG. 15. In the modification, the modification is mainly different from the above-described example embodiment illustrated in FIG. 9 in that the first fitting portion 21x is a protrusion and the second fitting portion 31x is a recess. A different point between the modification and the above-described example embodiment will mainly be described below.

Figure 15:
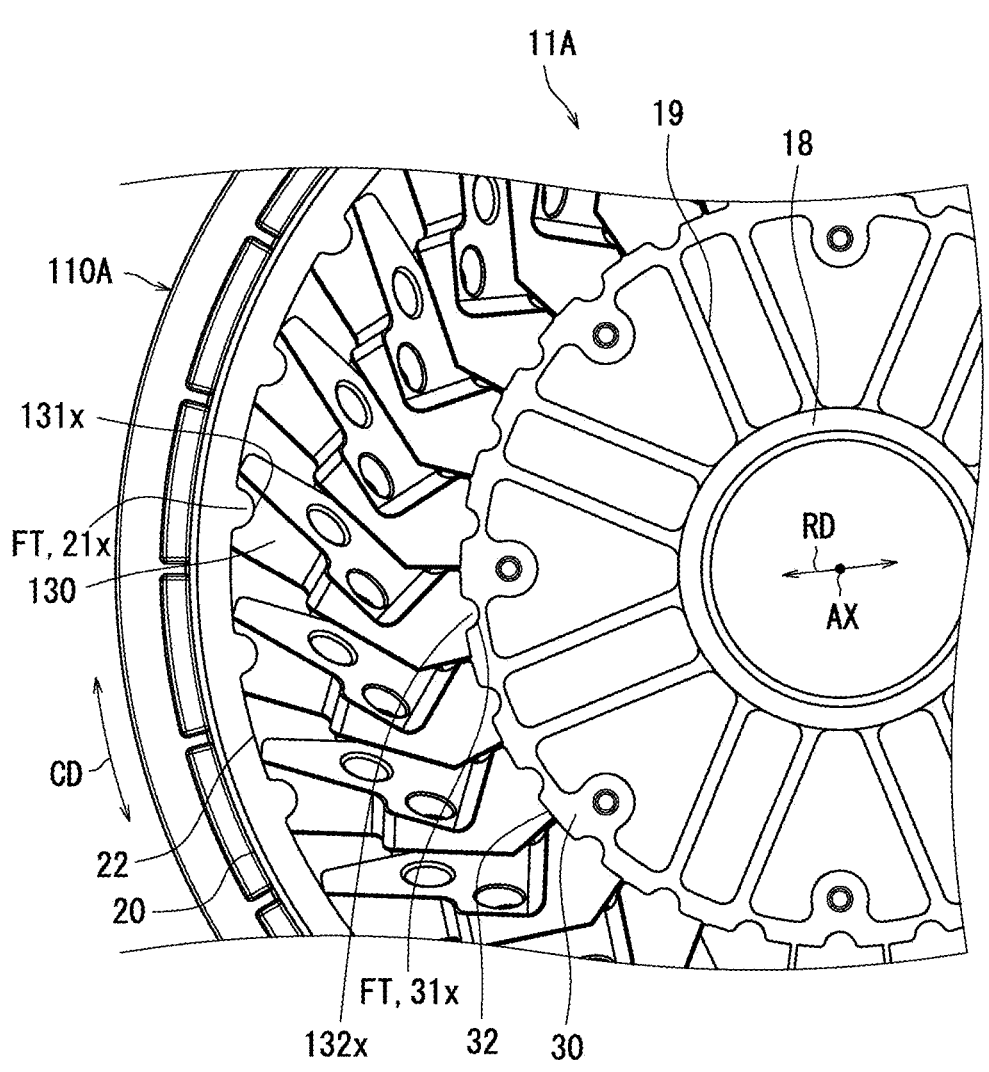
FIG. 15 is an enlarged plan view illustrating a portion of a roller arrangement portion and a portion of a plurality of roller support portions of a driving force transmission device according to a modification of the present example embodiment.

FIG. 15 is a plan view illustrating a portion of the roller arrangement portion 110A and a portion of the plurality of roller support portions 130 of the driving force transmission device 11A according to the modification of the present example embodiment. In FIG. 15, the drive roller 120 is omitted for simplification of the drawing.

As illustrated in FIG. 15, the roller arrangement portion 110A includes a plurality of fitting portions FT. The plurality of fitting portions FT include a plurality of first fitting portions 21x and a plurality of second fitting portions 31x. As an example, the first fitting portion 21x protrudes inward in the radial direction RD. That is, the first fitting portion 21x is a protrusion. The second fitting portion 31x is recessed inward in the radial direction RD. That is, the second fitting portion 31x is a recess. As described above, according to the present modification, the first fitting portion 21x and the second fitting portion 31x can have a simple structure. As a result, the roller arrangement portion 110A can be easily manufactured.

In the example of FIG. 15, the first fitting portion 21x has a substantially semi-columnar shape. The first fitting portion 21x extends in the axial direction AD. The plurality of first fitting portions 21x are disposed at equal intervals along the circumferential direction CD on the inner circumferential surface 22 of the outer frame portion 20.

In the example of FIG. 15, the second fitting portion 31x includes a curved surface recessed inward in the radial direction RD. The second fitting portion 31x extends in the axial direction AD. The plurality of second fitting portions 31x are disposed at equal intervals along the circumferential direction CD on the outer circumferential surface 32 of the inner frame portion 30.

Furthermore, in the example of FIG. 15, an outer end portion 131x of the roller support portion 130 is a recess recessed inward in the radial direction RD. The outer end portion 131x is fitted into the first fitting portion 21x. An inner end portion 132x of the roller support portion 130 is a protrusion protruding inward in the radial direction RD. The inner end portion 132x is fitted into the second fitting portion 31x.

Here, another modification will be described with reference to FIGS. 13 and 15. In the present disclosure, the roller arrangement portion 110A of FIG. 13 may include the first fitting portion 21x of FIG. 15 instead of the first fitting portion 21 of FIG. 13. In this case, the roller support portion 130 of FIG. 13 has the outer end portion 131x of FIG. 15 instead of the outer end portion 131 of FIG. 13. The same applies to the roller arrangement portion 110B.

In the present disclosure, the roller arrangement portion 110A in FIG. 13 may include the second fitting portion 31x in FIG. 15 instead of the second fitting portion 31 in FIG. 13. In this case, the roller support portion 130 of FIG. 13 has the inner end portion 132x of FIG. 15 instead of the inner end portion 132 of FIG. 13. The same applies to the roller arrangement portion 110B.

Example embodiments of the present disclosure have been described with reference to the drawings. However, the present disclosure is not limited to the above example embodiments, and can be implemented in various modes without departing from the gist of the present disclosure.

The plurality of elements disclosed in the above example embodiment can be appropriately modified. For example, one component of all components illustrated in one example embodiment may be added to a component of another example embodiment, or some components of all components illustrated in one example embodiment may be eliminated from the one example embodiment.

The drawings schematically show each element mainly in order to facilitate understanding of the disclosure, and the thickness, length, number, interval, and the like of the shown elements may be different from the actual ones for convenience of creation of the drawings. The configuration of each element illustrated in the above example embodiments is an example and is not particularly limited, and that various modifications can be made without substantially departing from the effects of the present disclosure.

[1] In the example embodiment having been described with reference to FIGS. 1 to 4, the rotary assembly DV (FIG. 3) is applied to the transport vehicle 1. However, the application of the rotary assembly DV is not limited to the transport vehicle 1, and the rotary assembly DV can be applied to any moving body moving on the floor surface or the ground surface. The moving body is, for example, a unicycle, a two-wheeler, a three-wheeler, or a four-wheeler. The moving body may have one rotary assembly DV or two or more rotary assemblies DV.

[2] In the present example embodiment having been described with reference to FIGS. 4 and 5, the rotation axis AX of the main wheel 5 and the rotation axis AX of the roller arrangement portion 110 substantially coincide with each other. However, the rotation axis of the roller arrangement portion 110 may be eccentric with respect to the rotation axis of the main wheel 5.

[3] In the present disclosure, the shapes of the first fitting portions 21 and 21*x* and the second fitting portions 31 and 31*x* are not particularly limited as long as the roller support portion 130 is fitted.

[4] In the example embodiment and the modifications described with reference to FIGS. 6 and 15, the roller arrangement portion 110 includes the plurality of fitting portions FT. However, the roller arrangement portion 110 may not include the plurality of fitting portions FT as long as the plurality of roller support portions 130 are fitted to the roller arrangement portion 110. For example, the plurality of roller support portions 130 are press-fitted or press-bonded to the roller arrangement portion 110.

In the example embodiment and the modification described with reference to FIGS. 6 and 15, the plurality of fitting portions FT are disposed along the circumferential direction CD on both the inner circumferential surface 22 of the outer frame portion 20 and the outer circumferential surface 32 of the inner frame portion 30. However, the plurality of fitting portions FT may be disposed along the circumferential direction CD on at least one of the inner circumferential surface 22 of the outer frame portion 20 and the outer circumferential surface 32 of the inner frame portion 30. That is, the plurality of fitting portions FT may include only the first fitting portion 21 or the first fitting portion 21*x*, or may include only the second fitting portion 31 or the second fitting portion 31*x*.

Note that the present technique can have a configuration below.

(1) A driving force transmission device that transmits a driving force to a main wheel including a plurality of driven rollers by rotating around a rotation axis, the driving force transmission device including: a plurality of drive rollers disposed in an annular shape and configured to transmit the driving force to the main wheel; a plurality of roller support portions disposed in an annular shape and rotatably supporting the plurality of drive rollers, respectively; and a roller arrangement portion in which the plurality of drive rollers and the plurality of roller support portions are disposed, in which the roller arrangement portion includes: a base portion expanding radially outward with respect to the rotation axis; an outer frame portion disposed along a circumferential direction around the rotation axis and protruding from the base portion in an axial direction along the rotation axis; and an inner frame portion disposed radially inside the outer frame portion and protruding from the base portion in an axial direction, and the plurality of roller support portions are fitted between an inner circumferential surface of the outer frame portion and an outer circumferential surface of the inner frame portion.

(2) The driving force transmission device according to (1), in which the roller arrangement portion further includes a plurality of fitting portions into which the plurality of roller support portions are respectively fitted, and the plurality of fitting portions are disposed along a circumferential direction on at least one of an inner circumferential surface of the outer frame portion and an outer circumferential surface of the inner frame portion.

(3) The driving force transmission device according to (2), in which the plurality of fitting portions includes: a plurality of first fitting portions that are disposed along a circumferential direction on an inner circumferential surface of the outer frame portion and to which radially outer end portions of the plurality of roller support portions are respectively fitted; and a plurality of second fitting portions disposed along a circumferential direction on an outer circumferential surface of the inner frame portion, and in which radially inner end portions of the plurality of roller support portions are fitted, respectively.

(4) The driving force transmission device according to (3), in which the first fitting portion is recessed radially outward or protrudes radially inward, and the second fitting portion protrudes radially outward or is recessed radially inward.

(5) The driving force transmission device according to (3) or (4), in which a first fitting portion of the plurality of first fitting portions and a second fitting portion of the plurality of second fitting portions face each other in a radial direction, and among the plurality of first fitting portions, a first fitting portion disposed adjacent to the first fitting portion radially facing the second fitting portion on one side in a circumferential direction and a first fitting portion disposed adjacent to the first fitting portion radially facing the second fitting portion on another side in a circumferential direction are disposed symmetrically with respect to the first fitting portion and the second fitting portion radially facing each other.

(6) The driving force transmission device according to any one of (3) to (5), in which the outer frame portion further includes a plurality of recesses recessed radially outward, the plurality of recesses are disposed along a circumferential direction on an inner circumferential surface of the outer frame portion, and the recess is located between the first fitting portion and the first fitting portion adjacent to each other in a circumferential direction.

(7) The driving force transmission device according to any one of (2) to (6), in which the base portion, the outer frame portion, the inner frame portion, and the plurality of fitting portions are formed of a single member.

(8) The driving force transmission device according to any one of (2) to (6), in which the roller arrangement portion further includes a pulley portion on which a toothed belt is bridged, the pulley portion is disposed along an outer circumferential edge of the roller arrangement portion, and the base portion, the outer frame portion, the inner frame portion, the plurality of fitting portions, and the pulley portion are formed of a single member.

(9) The driving force transmission device according to any one of (1) to (8), further including a contact portion that opposes a portion of each of the plurality of roller support portions in an axial direction and contacts a portion of each of the plurality of roller support portions.

(10) The driving force transmission device according to any one of (1) to (9), in which each of the plurality of drive rollers includes a roller body and a rotation shaft fixed to the roller body, a material of the plurality of roller support portions is a synthetic resin, the drive roller is disposed between the roller support portion and the roller support portion adjacent to each other in a circumferential direction, and the rotation shaft of the drive roller rotates while making contact with the roller support portion and the roller support portion adjacent to each other in a circumferential direction.

(11) A rotary assembly including a main wheel including a plurality of driven rollers disposed in an annular shape and rotating around a rotation axis; and a pair of driving force transmission devices configured to transmit a driving force to the main wheels, in which one driving force transmission device of the pair of driving force transmission devices is the driving force transmission device according to any one of (1) to (10), and transmits a driving force to the main wheel from one side in an axial direction along the rotation axis, and another driving force transmission device of the pair of driving force transmission devices has a structure symmetrical to the one driving force transmission device with respect to the main wheel, and transmits a driving force to the main wheel from another side in an axial direction along the rotation axis.

The present disclosure is applicable to, for example, a driving force transmission device and a rotary assembly.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A driving force transmission device to transmit a driving force to a main wheel including a plurality of driven rollers by rotating around a rotation axis, the driving force transmission device comprising:
a plurality of drive rollers annular in shape and configured to transmit the driving force to the main wheel;

a plurality of roller support portions annular in shape and rotatably supporting the plurality of drive rollers, respectively; and
a roller arrangement portion in which the plurality of drive rollers and the plurality of roller support portions are located; wherein
the roller arrangement portion includes:
a base portion extending radially outward with respect to the rotation axis;
an outer frame portion located along a circumferential direction around the rotation axis and protruding from the base portion in an axial direction along the rotation axis; and
an inner frame portion located radially inside the outer frame portion and protruding from the base portion in the axial direction; and
the plurality of roller support portions are fitted between an inner circumferential surface of the outer frame portion and an outer circumferential surface of the inner frame portion.

2. The driving force transmission device according to claim 1, wherein
the roller arrangement portion further includes a plurality of fitting portions into which the plurality of roller support portions are respectively fitted; and
the plurality of fitting portions are located along the circumferential direction on at least one of the inner circumferential surface of the outer frame portion and the outer circumferential surface of the inner frame portion.

3. The driving force transmission device according to claim 2, wherein the plurality of fitting portions includes:
a plurality of first fitting portions that are located along the circumferential direction on the inner circumferential surface of the outer frame portion and to which radially outer end portions of the plurality of roller support portions are respectively fitted; and
a plurality of second fitting portions located along the circumferential direction on the outer circumferential surface of the inner frame portion, and in which radially inner end portions of the plurality of roller support portions are fitted, respectively.

4. The driving force transmission device according to claim 3, wherein
the plurality of first fitting portions is recessed radially outward or protrudes radially inward; and
the plurality of second fitting portions protrudes radially outward or is recessed radially inward.

5. The driving force transmission device according to claim 3, wherein
a first fitting portion of the plurality of first fitting portions and a second fitting portion of the plurality of second fitting portions oppose each other in a radial direction; and
among the plurality of first fitting portions, a first fitting portion located adjacent to the first fitting portion radially opposing the second fitting portion on one side in the circumferential direction and a first fitting portion located adjacent to the first fitting portion radially opposing the second fitting portion on another side in the circumferential direction are provided symmetrically with respect to the first fitting portion and the second fitting portion radially opposing each other.

6. The driving force transmission device according to claim 3, wherein
the outer frame portion further includes a plurality of recesses recessed radially outward;

21 the plurality of recesses are located along the circumferential direction on the inner circumferential surface of the outer frame portion; and the recess is located between ones of the plurality of first fitting portions which are adjacent to each other in the circumferential direction.

7. The driving force transmission device according to claim 2, wherein the base portion, the outer frame portion, the inner frame portion, and the plurality of fitting portions are provided as a single monolithic structure.

8. The driving force transmission device according to claim 2, wherein the roller arrangement portion further includes a pulley portion on which a toothed belt is bridged;

the pulley portion is located along an outer circumferential edge of the roller arrangement portion; and the base portion, the outer frame portion, the inner frame portion, the plurality of fitting portions, and the pulley portion are provided as a single monolithic structure.

9. The driving force transmission device according to claim 1, further comprising a contact portion that opposes a portion of each of the plurality of roller support portions in the axial direction and contacts a portion of each of the plurality of roller support portions.

10. The driving force transmission device according to claim 1, wherein each of the plurality of drive rollers includes a roller body and a rotation shaft fixed to the roller body;

a material of the plurality of roller support portions is a synthetic resin;

at least one of the plurality of drive rollers is located between ones of the plurality of roller support portions which are adjacent to each other in the circumferential direction; and the rotation shaft of the at least one of the plurality of drive rollers rotates while making contact with the ones of the plurality of roller support portions which are adjacent to each other in the circumferential direction.

22

11. A rotary assembly comprising:

a main wheel including a plurality of driven rollers in an annular shape and rotatable around a rotation axis; and a pair of driving force transmission devices configured to transmit a driving force to the main wheels; wherein one driving force transmission device of the pair of driving force transmission devices includes:

a plurality of drive rollers annular in shape and configured to transmit the driving force to the main wheels;

a plurality of roller support portions annular in shape and rotatably supporting the plurality of drive rollers, respectively; and a roller arrangement portion in which the plurality of drive rollers and the plurality of roller support portions are located, wherein the roller arrangement portion includes:

a base portion extending radially outward with respect to the rotation axis;

an outer frame portion located along a circumferential direction around the rotation axis and protruding from the base portion in an axial direction along the rotation axis; and an inner frame portion located radially inside the outer frame portion and protruding from the base portion in the axial direction; and the plurality of roller support portions are fitted between an inner circumferential surface of the outer frame portion and an outer circumferential surface of the inner frame portion;

the one driving force transmission device of the pair of driving force transmission devices transmits a driving force to the main wheel from one side in the axial direction along the rotation axis; and another driving force transmission device of the pair of driving force transmission devices has a structure symmetrical to the one driving force transmission device with respect to the main wheel, and transmits a driving force to the main wheel from another side in the axial direction along the rotation axis.

* * * * *